(12) United States Patent
Asakura et al.

(10) Patent No.: US 11,974,057 B2
(45) Date of Patent: Apr. 30, 2024

(54) SOLID-STATE IMAGING ELEMENT AND IMAGING DEVICE

(71) Applicant: Sony Semiconductor Solutions Corporation, Kanagawa (JP)

(72) Inventors: Luonghung Asakura, Kanagawa (JP); Hiromu Kato, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 60 days.

(21) Appl. No.: 17/910,512

(22) PCT Filed: Feb. 17, 2021

(86) PCT No.: PCT/JP2021/005832
§ 371 (c)(1),
(2) Date: Sep. 9, 2022

(87) PCT Pub. No.: WO2021/215093
PCT Pub. Date: Oct. 28, 2021

(65) Prior Publication Data
US 2023/0028780 A1 Jan. 26, 2023

(30) Foreign Application Priority Data
Apr. 21, 2020 (JP) ................................. 2020-075185

(51) Int. Cl.
*H04N 25/616* (2023.01)
*H04N 25/75* (2023.01)
*H04N 25/772* (2023.01)

(52) U.S. Cl.
CPC ........... *H04N 25/616* (2023.01); *H04N 25/75* (2023.01); *H04N 25/772* (2023.01)

(58) Field of Classification Search
None
See application file for complete search history.

(56) References Cited

U.S. PATENT DOCUMENTS

2016/0316165 A1* 10/2016 Li .................. H04N 25/778
2017/0104946 A1 4/2017 Hong

FOREIGN PATENT DOCUMENTS

EP 3624441 A1 3/2020
JP 2018113606 A 7/2018
(Continued)

OTHER PUBLICATIONS

International Search Report (PCT/ISA/210), International Application No. PCT/JP2021/005832, dated May 18, 2021.
(Continued)

*Primary Examiner* — Mark T Monk
(74) *Attorney, Agent, or Firm* — Michael Best & Friedrich LLP

(57) ABSTRACT

Solid-state imaging elements are disclosed. In one example, an upstream circuit block generates a predetermined reset level and a plurality of signal levels each corresponding to an exposure amount, and causes capacitive elements, different from each other, to hold them. A selection circuit sequentially performs control to connect the capacitive element in which the reset level is held to a predetermined downstream node, control to disconnect capacitive elements from the downstream node, and control to connect the capacitive element in which any of the plurality of signal levels is held to the downstream node. A downstream reset transistor initializes a level of the downstream node when the capacitive elements are disconnected from the downstream node. A downstream circuit sequentially reads the reset level and the plurality of signal levels via the downstream node.

20 Claims, 30 Drawing Sheets

(56) References Cited

FOREIGN PATENT DOCUMENTS

| JP | 2018207488 A | 12/2018 |
| WO | WO-2011155442 A1 | 12/2011 |
| WO | WO-2019009213 A1 | 1/2019 |
| WO | 2019239670 A1 | 12/2019 |

OTHER PUBLICATIONS

Jae-kyu Lee, et al., A 2.1e-Temporal Noise and -105dB Parasitic Light Sensitivity Backside-Illuminated 2.3 µm-Pixel Voltage-Domain Global Shutter CMOS Image Sensor Using High-Capacity DRAM Capacitor Technology, ISSCC 2020.

\* cited by examiner

FIG. 10
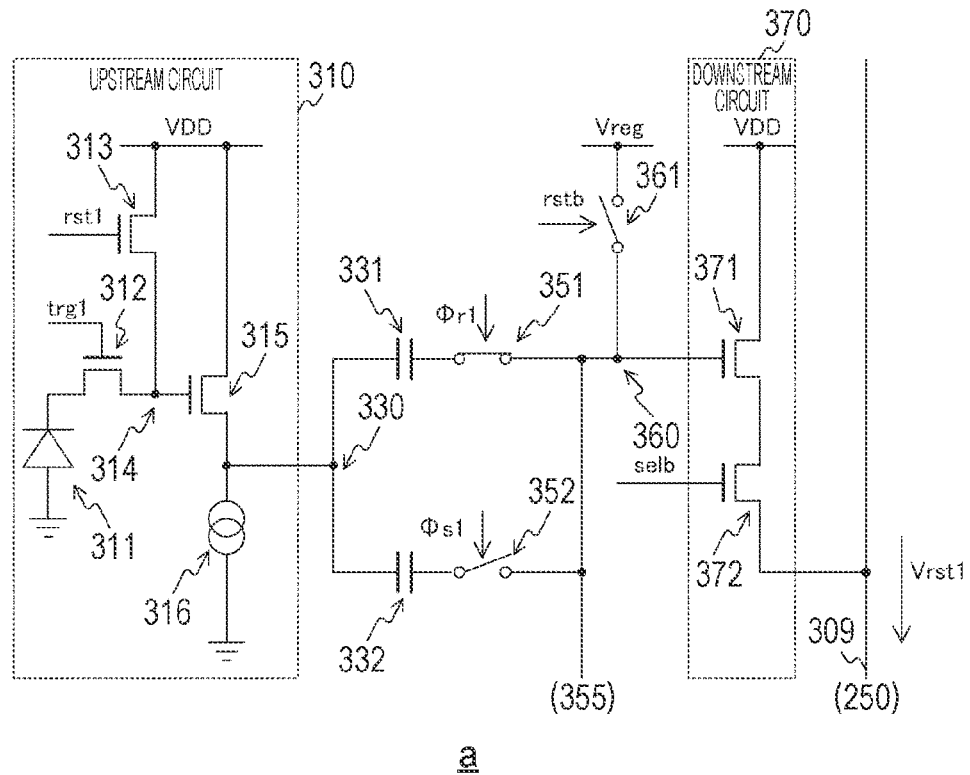
a
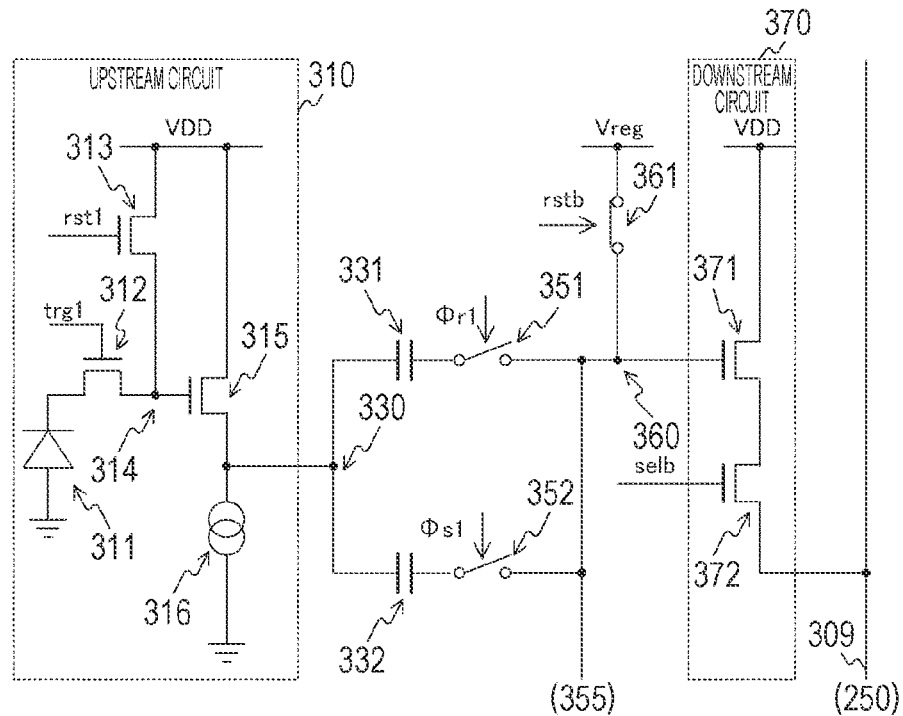
b

FIG. 17
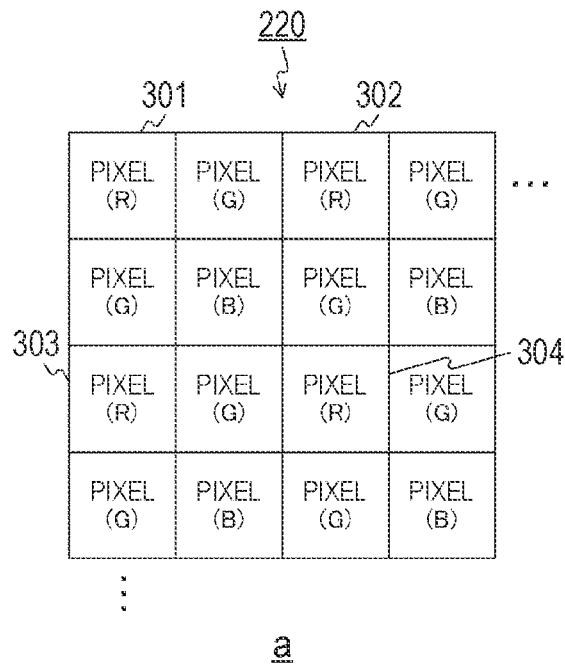
a
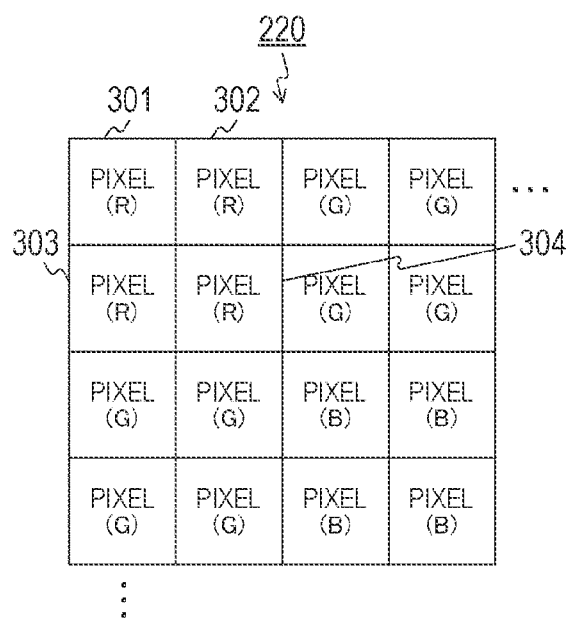
b

SOLID-STATE IMAGING ELEMENT AND IMAGING DEVICE

TECHNICAL FIELD

The present technology relates to a solid-state imaging element. Specifically, the present technology relates to a solid-state imaging element and an imaging device that perform analog to digital (AD) conversion for each column.

BACKGROUND ART

Conventionally, a column analog to digital converter (ADC) system in which an ADC is arranged for every column outside a pixel array section and pixel signals are sequentially read row by row has been used in a solid-state imaging element for the purpose of miniaturizing pixels. In this column ADC system, when exposure is performed by a rolling shutter system in which exposure is started row by row, there is a possibility that rolling shutter distortion occurs. Thus, proposed is a solid-state imaging element in which a pair of capacitors is provided for each pixel to hold a reset level and a signal level in the capacitors in order to achieve a global shutter system in which exposure is simultaneously started in all pixels (see, for example, Non-Patent Document 1). The pair of capacitors is connected in series to a source follower circuit via a node, and the reset level and the signal level are sequentially read by the source follower circuit.

CITATION LIST

Non-Patent Document

Non-Patent Document 1: Jae-kyu Lee, et al., A 2.1e-Temporal Noise and −105 dB Parasitic tight Sensitivity Backside-Illuminated 2.3 μm-Pixel Voltage-Domain Global Shutter CMOS image Sensor Using High-Capacity DRAM Capacitor Technology, ISSCC 2020.

SUMMARY OF THE INVENTION

Problems to be Solved by the Invention

In the above-described conventional technology, the global shutter system in the column ADC system is achieved by holding the reset level and the signal level in the pair of capacitors for every pixel. However, when a transistor in the source follower circuit initializes the node connected to the capacitor, there is a problem that kTC noise (in other words, reset noise) at a level corresponding to the capacitor is generated so that image quality of image data is degraded by the noise.

The present technology has been made in view of such a situation, and an object thereof is to improve image quality in a solid-state imaging element that simultaneously performs exposure in all pixels.

Solutions to Problems

The present technology has been made to solve the above-described problem, and a first aspect thereof relates to a solid-state imaging element including: a predetermined number of capacitive elements; an upstream circuit block that generates each of a predetermined reset level and a plurality of signal levels each corresponding to an exposure amount and causes the capacitive elements, different from each other, to hold the reset level and the plurality of signal levels; a selection section that sequentially performs control to connect the capacitive element in which the reset level is held among the predetermined number of capacitive elements to a predetermined downstream node, control to disconnect the predetermined number of capacitive elements from the downstream node, and control to connect the capacitive element in which any of the plurality of signal levels is held among the predetermined number of capacitive elements to the downstream node; a downstream reset transistor that initializes a level of the downstream node when the predetermined number of capacitive elements are disconnected from the downstream node; and a downstream circuit that sequentially reads each of the reset level and the plurality of signal levels via the downstream node. This brings about an effect that kTC noise is reduced.

Furthermore, in the first aspect, the predetermined number of capacitive elements may include first and second capacitive elements and third and fourth capacitive elements, the upstream circuit block may include a first upstream circuit that sequentially generates a first reset level and a first signal level and causes the first and second capacitive elements to hold the first reset level and the first signal level and a second upstream circuit that sequentially generates a second reset level and a second signal level and causes the third and fourth capacitive elements to hold the second reset level and the second signal level, and the selection section may include a first selection circuit that connects any of the first and second capacitive elements to the downstream node and a second selection circuit that connects any of the third and fourth capacitive elements to the downstream node. This brings about an effect that the reset level and the signal level of each of two pixels are held.

Furthermore, in the first aspect, the first upstream circuit may include a first photoelectric conversion element, a first upstream transfer transistor that transfers a charge from the first photoelectric conversion element to a first floating diffusion layer, a first reset transistor that initializes the first floating diffusion layer, and a first upstream amplification transistor that amplifies a voltage of the first floating diffusion layer, and the second upstream circuit may include a second photoelectric conversion element, a second upstream transfer transistor that transfers a charge from the second photoelectric conversion element to a second floating diffusion layer, a second reset transistor that initializes the second floating diffusion layer, and a second upstream amplification transistor that amplifies a voltage of the second floating diffusion layer. This brings about an effect that a level corresponding to the voltage of the floating diffusion layer is held.

Furthermore, in the first aspect, the first upstream circuit may further include a first current source transistor connected to a first upstream node, the second upstream circuit may further include a second current source transistor connected to a second upstream node, the first upstream amplification transistor may amplify the voltage of the first floating diffusion layer and output the amplified voltage to the first upstream node, the second upstream amplification transistor may amplify the voltage of the second floating diffusion layer and output the amplified voltage to the second upstream node, the first and second capacitive elements may respectively have first ends connected in common to the first upstream node and second ends connected to the first selection circuit, and the third and fourth capacitive elements may respectively have first ends connected in common to the second upstream node and second ends connected to the second selection circuit. This brings about an effect that a constant current is supplied for every pixel.

Furthermore, in the first aspect, the first and second upstream transfer transistors may transfer the charges to the first and second floating diffusion layers and the first and second reset transistors may initialize the first and second photoelectric conversion elements together with the first and second floating diffusion layers at a predetermined exposure start timing, and the first and second upstream transfer transistors may transfer the charges to the first and second floating diffusion layers at a predetermined exposure end timing. This brings about an effect that all pixels are simultaneously exposed.

Furthermore, in the first aspect, the selection section may sequentially perform control to connect one of the first and second capacitive elements to the downstream node, control to connect another of the first and second capacitive elements to the downstream node, control to connect one of the third and fourth capacitive elements to the downstream node, and control to connect another of the third and fourth capacitive elements to the downstream node. This brings about an effect that the reset level and the signal level of each of the two pixels are sequentially read.

Furthermore, in the first aspect, the selection section may sequentially perform control to connect both one of the first and second capacitive elements and one of the third and fourth capacitive elements to the downstream node and control to connect both another of the first and second capacitive elements and another of the third and fourth capacitive elements to the downstream node in a predetermined addition mode. This brings about an effect that a signal obtained by pixel addition is read.

Furthermore, in the first aspect, the first upstream circuit may further include a first upstream selection transistor that outputs the voltage amplified by the first upstream amplification transistor to a predetermined upstream node in accordance with a predetermined first selection signal, the second upstream circuit may include a second upstream selection transistor that outputs the voltage amplified by the second upstream amplification transistor to the upstream node in accordance with a predetermined second selection signal and a current source transistor connected to the upstream node, the first and second capacitive elements may respectively have first ends connected in common to the upstream node and second ends connected to the first selection circuit, and the third and fourth capacitive elements may respectively have first ends connected in common to the upstream node and second ends connected to the second selection circuit. This brings about an effect that a current source transistor is shared by the two pixels.

Furthermore, in the first aspect, the first and second upstream selection transistors may sequentially transition to a closed state immediately before a predetermined exposure end timing and after the exposure end timing, the first reset transistor may initialize the first floating diffusion layer when the first upstream selection transistor is in the closed state, the second reset transistor may initialize the second floating diffusion layer when the second upstream selection transistor is in the closed state, the first and second upstream selection transistors may sequentially transition to the closed state immediately after the exposure end timing, and the first and second upstream transfer transistors may transfer the charges at a predetermined exposure end timing. This brings about an effect that all the pixels are exposed simultaneously in the configuration in which the car rent source transistor is shared by the two pixels.

Furthermore, in the first aspect, a short-circuit transistor that opens and closes a path between a first downstream node and a second downstream node may be further provided, the predetermined number of capacitors may include first, second, third, fourth, fifth, sixth, seventh, and eighth capacitive elements, the selection section may include a first selection circuit that connects any of the first and second capacitive elements to the first downstream node, a second selection circuit that connects any of the third and fourth capacitive elements to the first downstream node, a third selection circuit that connects any of the fifth and sixth capacitive elements to the second downstream node, and a fourth selection circuit that connects any of the seventh and eighth capacitive elements to the second downstream node. This brings about an effect that the first downstream node and the second downstream node are short-circuited.

Furthermore, in the first aspect, the short-circuit transistor may be in an open state in a predetermined non-addition mode, and in the non-addition mode, the selection section may perform control to sequentially connect each of the first and second capacitive elements to the first downstream node, control to sequentially connect each of the third and fourth capacitive elements to the first downstream node, control to sequentially connect each of the fifth and sixth capacitive elements to the second downstream node, and control to sequentially connect each of the seventh and eighth capacitive elements co the second downstream node in a predetermined order. This brings about an effect that the reset level and the signal level of each of four pixels are sequentially read in the non-addition mode.

Furthermore, in the first aspect, the short-circuit transistor may be in a closed state in a predetermined addition mode, and in the addition mode, the selection section may sequentially perform control to connect one of the fifth and sixth capacitive elements and one of the seventh and eighth capacitive elements to the second downstream node while connecting one, of the first and second capacitive elements and one of the third and fourth capacitive elements to the first downstream node, and control to connect another of the fifth and sixth capacitive elements and another of the seventh and eighth capacitive elements to the second downstream node while connecting another of the first and second capacitive elements and another of the third and fourth capacitive elements to the first downstream node. This brings an effect that the four pixels are added in a pixel addition mode.

Furthermore, in the first aspect, the predetermined number of capacitive elements may include first and second capacitive elements and a third capacitor, the upstream circuit block may include a first photoelectric conversion element, a first upstream transfer transistor that transfers a charge from the first photoelectric conversion element to a predetermined floating diffusion layer, a second photoelectric conversion element, a second upstream transfer transistor that transfers a charge from the second photoelectric conversion element to a predetermined floating diffusion layer, a reset transistor that initializes the floating diffusion layers, and an upstream amplification transistor that amplifies voltages of the floating diffusion layers and outputs the amplified voltages to a predetermined upstream node, and the first and second capacitive elements and the third capacitive element may respectively have first ends connected in common to the upstream node and second ends connected to the selection section. This brings about an effect that the reset level and the plurality of signal levels are held.

Furthermore, in the first aspect, the first and second upstream transfer transistors may transfer the charges to the floating diffusion layers and the reset transistor may initialize the first and second photoelectric conversion elements together with the floating diffusion layers at a predetermined exposure start timing, and the first and second upstream transfer transistors may sequentially transfer the charges to the first and second floating diffusion layers at a predetermined exposure end timing. This brings about an effect that all the pixels are exposed.

Furthermore, in the first aspect, the selection section may sequentially perform control to connect one of the first and second capacitive elements to the downstream node, control to connect another of the first and second capacitive elements to the downstream node, and control to connect the third capacitive element to the downstream node. This brings about an effect that the reset level and the plurality of signal levels are sequentially read.

Furthermore, in the first aspect, the upstream circuit block may be provided on a first chip, and the predetermined number of capacitive elements, the selection section, the downstream reset transistor, and the downstream circuit may be provided on a second chip. This brings about an effect that miniaturization of a pixel is facilitated.

Furthermore, in the first aspect, an analog-to-digital converter that sequentially converts the output reset level and the plurality of output signal levels into digital signals may be further provided, and the analog-to-digital converter may be provided on the second chip. This brings about an effect that miniaturization of a pixel is facilitated.

Furthermore, in the first aspect, an analog-to-digital converter that sequentially converts the output reset level and the plurality of output signal levels into digital signals may be further provided, and the analog-to-digital converter may be provided on a third chip. This brings about an effect that miniaturization of a pixel is facilitated.

Furthermore, a second aspect of the present technology relates to an imaging device including: a predetermined number of capacitive elements; an upstream circuit block that generates each of a predetermined reset level and a plurality of signal levels each corresponding to an exposure amount and causes the capacitive elements, different from each other, to hold the reset level and the plurality of signal levels; a selection section that sequentially performs control to connect the capacitive element in which the reset level is held among the predetermined number of capacitive elements to a predetermined downstream node, control to disconnect the predetermined number of capacitive elements from the downstream node, and control to connect the capacitive element in which any of the plurality of signal levels is held among the predetermined number of capacitive elements to the downstream node; a downstream reset transistor that initializes a level of the downstream node when the predetermined number of capacitive elements are disconnected from the downstream node; a downstream circuit that sequentially reads each of the reset level and the plurality of signal levels via the downstream node; and a signal processing circuit that sequentially converts the reset level and the plurality of signal levels into digital signals and processes the digital signals. This brings about an effect that image data with reduced kTC noise is generated.

Furthermore, a third aspect of the present technology relates co a solid-state imaging element including: a first photoelectric conversion element that converts incident light into a charge; a second photoelectric conversion element that converts incident light into a charge; an upstream amplification transistor that converts the charges into voltages; a predetermined number of capacitive elements each having first end connected to an upstream node which is an output destination of the upstream amplification transistor; a predetermined number of selection transistors inserted in each of paths between each of second ends of the predetermined number of capacitive elements and a predetermined downstream node; a reset transistor having a source or a drain connected to the downstream node; and a downstream amplification transistor that has a gate connected to the downstream node and outputs a pixel signal. This brings about an effect that kTC noise is reduced.

BRIEF DESCRIPTION OF DRAWINGS

FIG. 10 is a diagram depicting examples of states of the pixel block at the time of reading a reset level and at the time of initializing a downstream node in the first embodiment of the present technology.

FIG. 17 is a plan view depicting a configuration example of a pixel array section in a second embodiment of the present technology.

MODE FOR CARRYING OUT THE INVENTION

Hereinafter, modes for carrying out the present technology (hereinafter, referred to as embodiments) wild be described. The description will be given in the following order.
1. First Embodiment (Example in Which Reset Level and Signal Level Are Held in Plurality of Capacitors)
2. Second Embodiment (Example in which Reset Level and Signal Level Are Held in Plurality of Capacitors and Downstream Nodes Are Short-Circuited)
3. Third Embodiment (Example in Which Reset Level and Signal Level Are Held in Plurality Of Capacitors and Current Source Is Shared)
4. Fourth Embodiment (Example in Which Reset Level Is Held One Capacitor and Signal Level Is Held in Plurality of Capacitors)
5. Example of Application to Mobile Body 1. First Embodiment

Figure 1:
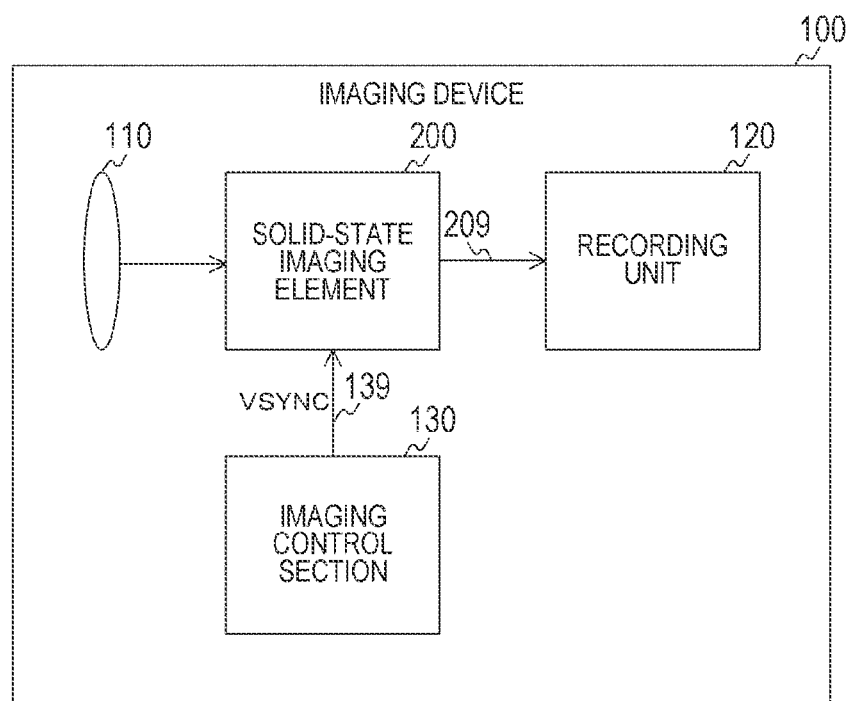
FIG. 1 is a block diagram depicting a configuration example of an imaging device in a first embodiment of the present technology.

[Configuration Example of Imaging Device]
FIG. 1 is a block diagram depicting a configuration example of an imaging device 100 in a first embodiment of the present technology. The imaging device 100 is a device that images image data, and includes an imaging lens 110, a solid-state imaging element 200, a recording unit 120, and an imaging control section 130. As the imaging device 100, a digital camera or an electronic device (a smartphone, a personal computer, or the like) having an imaging function is assumed.

The solid-state imaging element 200 images image data under the control of the imaging control section 130. The solid-state imaging element 200 supplies the image data to the recording unit 120 via a signal line 209.

The imaging lens 110 collects light and guides the light to the solid-state imaging element 200. The imaging control section 130 controls the solid-state imaging element 200 to image the image data. The imaging control section 130 supplies, for example, an imaging control signal including a vertical synchronization signal VSYNC to the solid-state imaging element 200 via a signal line 139. The recording unit 120 records the image data.

Here, the vertical synchronization signal VSYNC is a signal indicating an imaging timing, and a periodic signal of a constant frequency (such as 60 hertz) is used as the vertical synchronization signal VSYNC.

Incidentally the imaging device 100 records the image data, the image data may be transmitted to the outside of the imaging device 100. In this case, an external interface configured to transmit the image data is further provided. Alternatively, the imaging device 100 may further display the image data. In this case, a display section is further provided.

Figure 2:
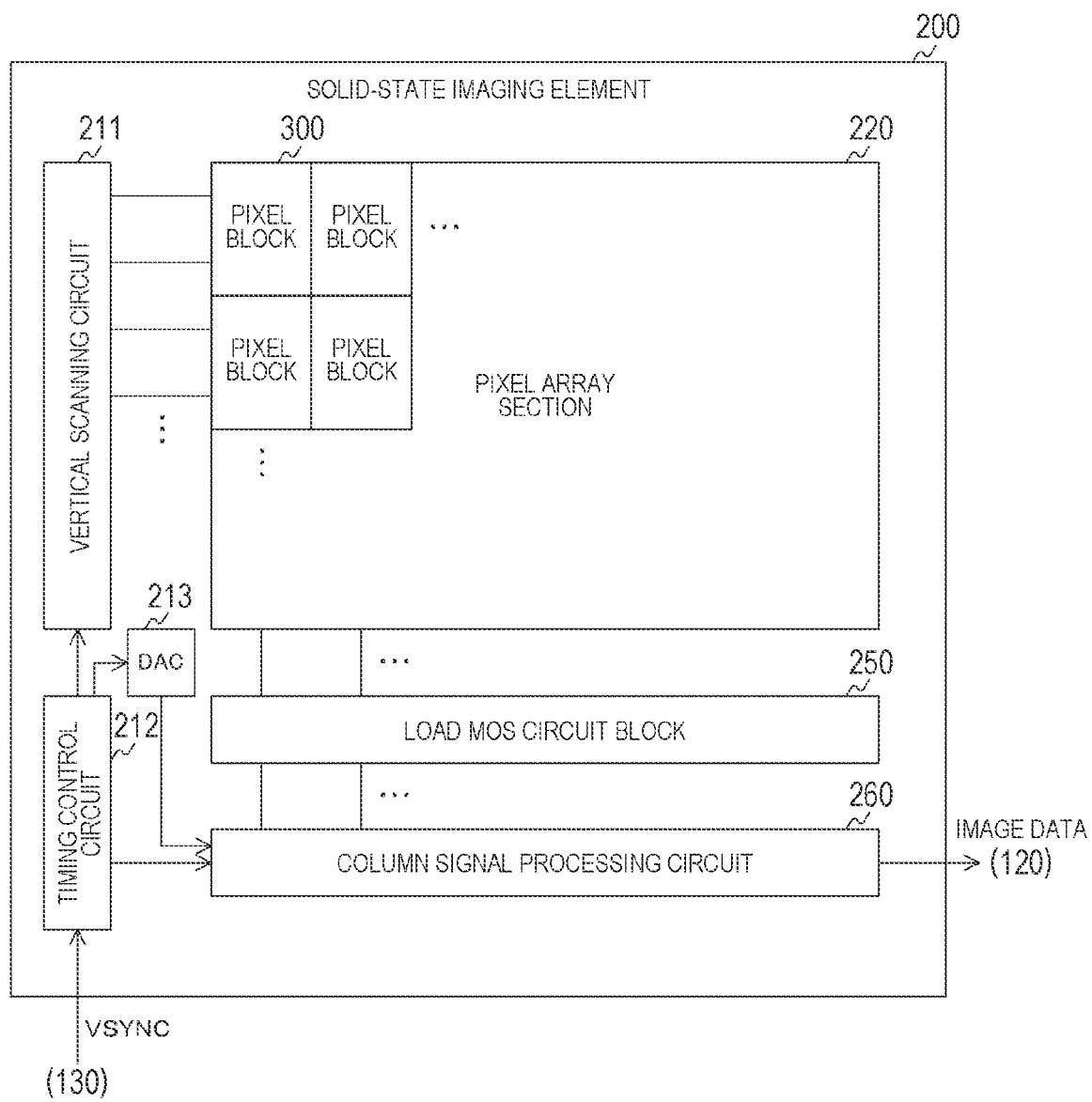
FIG. 2 is a block diagram depicting a configuration example of a solid-state imaging element in the first embodiment of the present technology.

[Configuration Example of Solid-State Imaging Element]
FIG. 2 is a block diagram depicting a configuration example of the solid-state imaging element 200 in the first embodiment of the present technology. The solid-state imaging element 200 includes a vertical scanning circuit 211, a pixel array section 220, a timing control circuit 212, a digital to analog converter (DAC) 213, a load SIPS circuit block 250, and a column signal processing circuit 260. In the pixel array section 220, a plurality of pixel blocks 300 is arrayed in a two-dimensional lattice pattern. In each of the pixel blocks 300, a plurality of pixels (for example, two pixels) is arrayed. Furthermore, each of the circuits in the solid-state imaging element 200 is provided on, for example, a single semiconductor chip.

Hereinafter, the pixel block 300 or a set of pixels arrayed in the horizontal direction is referred to as a "row", and the pixel block 300 or a set of pixels arrayed in a direction perpendicular to the row is referred to as a "column".

The timing control circuit 212 controls an operation timing of each of the vertical scanning circuit 211, the DAC 213, and the column signal processing circuit 260 in synchronization with the vertical synchronization signal VSYNC from the imaging control section 130.

The DAC 213 generates a ramp signal of a sawtooth wave shape by digital-to-analog (DA) conversion. The DAC 213 supplies the generated ramp signal to the column signal processing circuit 260.

The vertical scanning circuit 211 sequentially selects and drives rows and outputs analog pixel signals. The pixel photoelectrically converts incident light to generate the analog pixel signal. This pixel supplies the pixel signal to the column signal processing circuit 260 via the load MOS circuit block 250.

In the load MOS circuit block 250, a MOS transistor that supplies a constant current is provided for every column.

The column signal processing circuit 260 executes signal processing such as AD conversion processing and correlated double sampling (CDS) processing on the pixel signal for every column. The column signal processing circuit 260 supplies image data including the processed signal to the recording unit 120. Incidentally, the column signal processing circuit 260 is an example of a signal processing circuit described in the claims.

[Configuration Example of Pixel Block]

Figure 3:
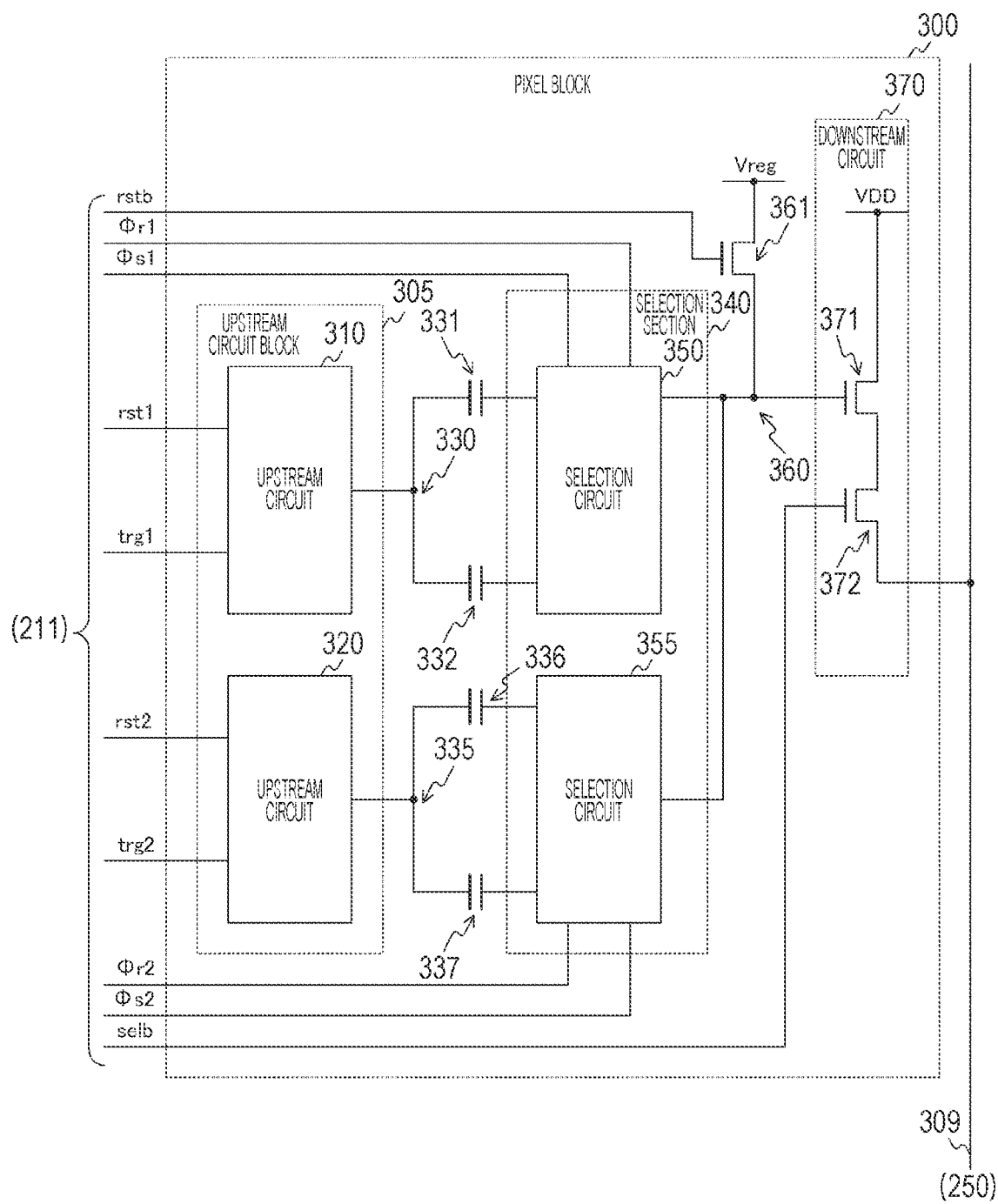
FIG. 3 is a circuit diagram depicting a configuration example of a pixel block in the first embodiment of the present technology.

FIG. 3 is a circuit diagram depicting a configuration example of the pixel block 300 in the first embodiment of the present technology. In the pixel block 300, an upstream circuit block 305, capacitive elements 331, 332, 336, and 337, a selection section 340, a downstream reset transistor 361, and a downstream circuit 370 are arranged. As the capacitive elements 331, 332, 336, and 337, for example, a capacitor having a metal-insulator-metal (MIM) structure is used.

Incidentally, the capacitive elements 331 and 332 are examples of first and second capacitive elements described in the claims, and the capacitive elements 336 and 337 are examples of third and fourth capacitive elements described in the claims.

Furthermore, upstream circuits 310 and 320 are arranged in the upstream circuit block 305. Selection circuits 350 and 355 are arranged in the selection section 340. The downstream circuit 370 includes a downstream amplification transistor 371 and a downstream selection transistor 372.

The upstream circuit 310 sequentially generates a reset level and a signal level and causes the capacitive elements 331 and 332 to hold the reset level and the signal level. The upstream circuit 320 sequentially generates a reset level and a signal level and causes the capacitive elements 336 and 337 to hold the reset level and the signal level. Incidentally, the upstream circuit 310 is an example of a first upstream circuit described in the claims, and the upstream circuit 320 is an example of a second upstream circuit described in the claims.

The selection circuit 350 connects one of the capacitive elements 331 and 332 to the downstream node 360. The selection circuit 355 connects one of the capacitive elements 336 and 337 to the downstream node 360. Incidentally, the selection circuit 350 is an example of a first selection circuit described in the claims, and the selection circuit 355 is an example of a second selection circuit described in the claims.

Figure 4:
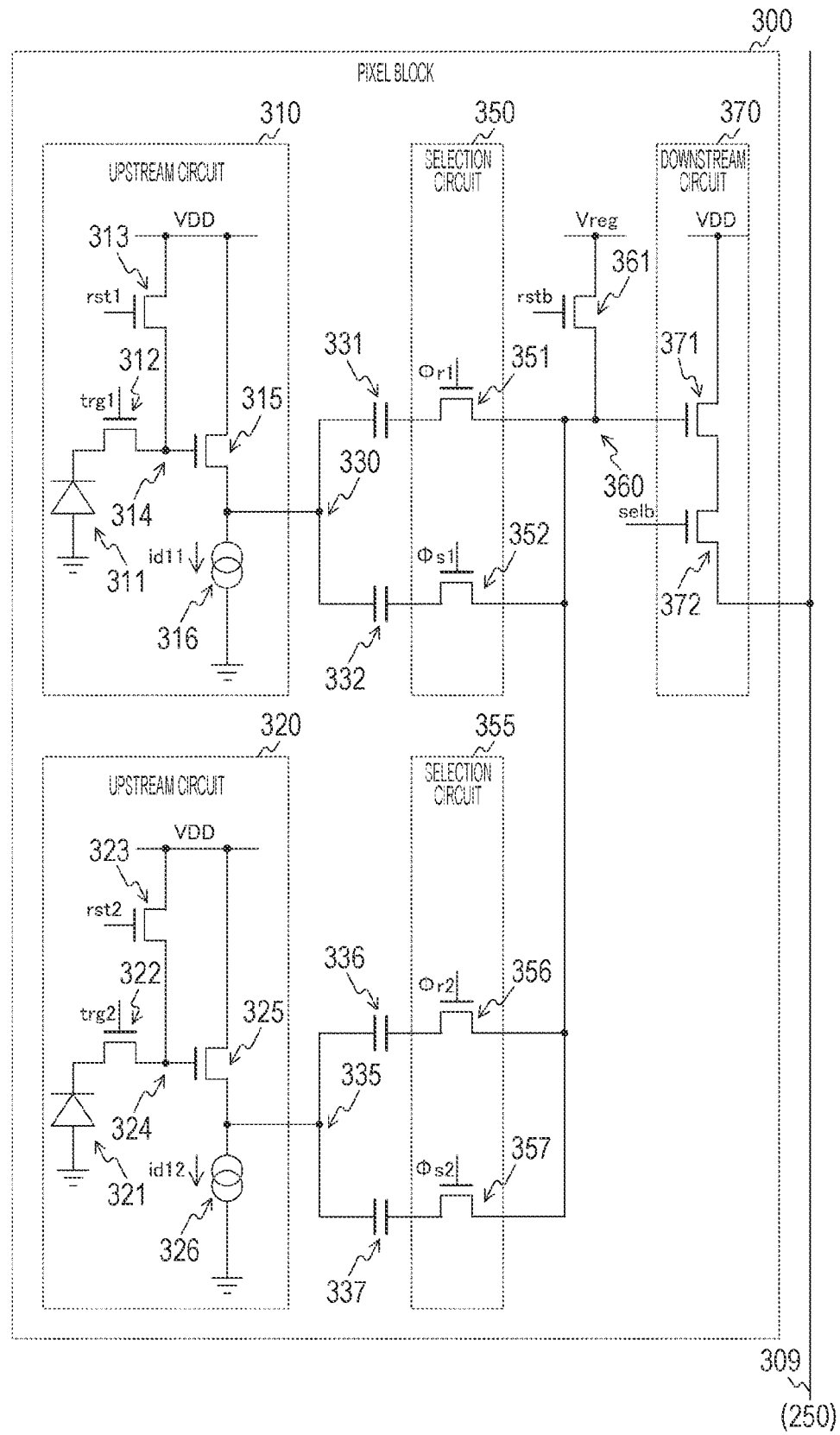
FIG. 4 is a circuit diagram depicting a configuration example of an upstream circuit and a selection circuit in the first embodiment of the present technology.

FIG. 4 is a circuit diagram depicting a configuration example of the upstream circuits 310 and 320 and the selection circuits 350 and 355 in the first embodiment of the present technology.

The upstream circuit 310 includes a photoelectric conversion element 311, a transfer transistor 312, a floating diffusion (FD) reset transistor 313, an FD 314, an upstream amplification transistor 315, and a current source transistor 316.

Furthermore, the upstream circuit 320 includes a photoelectric conversion element 321, a transfer transistor 322, an FD reset transistor 323, an FD 324, an upstream amplification transistor 325, and a current source transistor 326.

The photoelectric conversion elements 311 and 321 generate charges by photoelectric conversion. The transfer transistor 312 transfers the charge from the photoelectric conversion element 311 to the FD 314 in accordance with a transfer signal trg1 from the vertical scanning circuit 211. The transfer transistor 322 transfers the charge from the photoelectric conversion element 321 to the FD 324 in accordance with a transfer signal trg2 from the vertical scanning circuit 211.

Incidentally, the photoelectric conversion elements 311 and 321 are examples of first and second photoelectric conversion elements described in the claims. The transfer transistors 312 and 322 are examples of first and second transfer transistors described in the claims.

The FD reset transistor 313 extracts and initializes the charge from the FD 314 in accordance with an FD reset signal rst1 from the vertical scanning circuit 211. The FD reset transistor 323 extracts and initializes the charge from the FD 324 in accordance with an FD reset signal rst2 from the vertical scanning circuit 211. The FDs 314 and 324 accumulate the charges and generate voltages corresponding to charge amounts, respectively.

Incidentally, the FD reset transistors 313 and 323 are examples of first and second reset transistors described is the claims. The FDs 314 and 324 are examples of first and second floating diffusion layers described is the claims.

The upstream amplification transistor 315 amplifies a level of the voltage of the FD 314 and outputs the amplified voltage to the upstream node 330. The upstream amplification transistor 325 amplifies a level of the voltage of the FD 324 and outputs the amplified voltage to the upstream node 335. Incidentally, the upstream amplification transistors 315 and 325 are examples of first and second upstream amplification transistors described in the claims.

Drains of the FD reset transistors 313 and 323 and the upstream amplification transistors 315 and 325 are connected to a power supply voltage VDD. The current source transistor 316 is connected to a source of the upstream amplification transistor 315. The current source transistor 316 supplies a current id11 under the control of the vertical scanning circuit 211. The current source transistor 326 is connected to a source of the upstream amplification transistor 325. The current source transistor 326 supplies a current id12 under the control of the vertical scanning circuit 211.

Incidentally, the current source transistors 316 and 326 are examples of first and second current source transistors described in the claims.

The capacitive elements 331 and 332 have one ends connected in common to the upstream node 330 and the other ends connected to the selection circuit 350. The capacitive elements 336 and 337 have one ends connected in common to the upstream node 335 and the other ends connected to the selection circuit 355.

The selection circuit 350 includes selection transistors 351 and 352. The selection transistor 351 opens and closes a path between the capacitive element 331 and the downstream node 360 in accordance with a selection signal Φr1 from the vertical scanning circuit 211. The selection transistor 352 opens and closes a path between the capacitive element 332 and the downstream node 360 in accordance with a selection signal Φs1 from the vertical scanning circuit 211.

The selection circuit 355 includes selection transistors 356 and 357. The selection transistor 356 opens and closes a path between the capacitive element 336 and the downstream node 360 in accordance with a selection signal Φr2 from the vertical scanning circuit 211. The selection transistor 357 opens and closes a path between the capacitive element 337 and the downstream node 360 in accordance with a selection signal Φs2 from the vertical scanning circuit 211.

The downstream reset transistor 361 initializes a level of the downstream node 360 to a predetermined potential Vreg in accordance with a downstream reset signal rstb from the vertical scanning circuit 211. As the potential Vreg, a potential (for example, a potential lower than VDD) different from the power supply potential VDD is set.

In the downstream circuit 370, the downstream amplification transistor 371 amplifies the level of the downstream node 360. The downstream selection transistor 372 outputs a signal at the level amplified by the downstream amplification transistor 371 to the vertical signal line 309 as a pixel signal in accordance with a downstream selection signal selb from the vertical scanning circuit 211.

Incidentally, for example, n-channel metal oxide semiconductor (nMOS) transistors are used as various transistors (the transfer transistors 312 and the like) in the pixel block 300.

The above-described circuit including the upstream circuit 310, the capacitive elements 331 and 332, the selection circuit 350, the downstream reset transistor 361, and the downstream circuit 370 functions as one pixel. Furthermore, the circuit including the upstream circuit 320, the capacitive elements 336 and 337, the selection circuit 355, the downstream reset transistor 361, and the downstream circuit 370 also functions as one pixel. The downstream reset transistor 361 and the downstream circuit 370 are shared by these two pixels.

Furthermore, two pixels in the pixel block 300 are arrayed in the column direction, for example. In other words, these two pixels are arranged in an odd row and an even row. Incidentally, the positional relationship between the two pixels in the pixel block 300 is not limited to the odd row and the even row. For example, the two pixels can be also arranged in an odd column and an even column. Alternatively, one of the two pixels may be arranged obliquely above the other.

The vertical scanning circuit 211 supplies a high-level FD reset signal (rst1 or rst2) and a high-level transfer signal (trg1 or trg2) to all rows when exposure is started. Therefore, the photoelectric conversion element (311 or 321) is initialized. Hereinafter, this control is referred to as "PD reset".

Then, the vertical scanning circuit 211 supplies the high-level FD reset signals rst1 and rst2 over a pulse period while setting the downstream reset signal rstb and the selection signals Φr1 and Φr2 to a high level for all rows immediately before the exposure ends. Therefore, the FDs 314 and 324 are initialized, and levels corresponding to the levels of the FDs 314 and 324 at that time are held in the capacitive elements 331 and 336. This control is hereinafter referred to as "FD reset".

The levels of the FDs 314 and 324 at the time of the FD reset and the levels (the levels held in the capacitive elements 331 and 336 and the level of the vertical signal line 309) corresponding to the levels are hereinafter collectively referred to as a "P phase" or a "reset level".

When the exposure ends, the vertical scanning circuit 211 supplies high-level transfer signals trg1 and trg2 over a pulse period while setting the downstream reset signal rstb and the selection signals Φs1 and Φs2 to the high level for all rows. Therefore, signal charges corresponding to exposure amounts are transferred to the FDs 314 and 324, and levels corresponding to the levels of the FDs 314 and 324 at that time are held in the capacitive elements 332 and 337, respectively.

The levels of the FDs 314 and 324 when the signal charges are transferred and the levels (the levels held in the capacitive elements 332 and 337 and the level of the vertical signal line 309) corresponding to the levels are hereinafter collectively referred to as a "D phase" or a "signal level".

Such exposure control in which the exposure is started and ended simultaneously for all the pixels is called a global shutter system. This exposure control causes the upstream circuits 310 of all the pixels sequentially generate the reset level and the signal level. The reset level is held in the capacitive elements 331 and 336, and the signal level is held in the capacitive elements 332 and 337.

After the exposure ends, the vertical scanning circuit 211 sequentially selects a row and sequentially outputs the reset level and the signal level of the row. When the reset level is to be output, the vertical scanning circuit 211 supplies the high-level selection signal Φr1 or Φr2 over a predetermined period while setting the FD reset signal rst1 or rst2 and the downstream selection signal selb of the selected row to the high level. Therefore, the capacitive element 331 or 336 is connected to the downstream node 360 so that the reset level is read.

After the reset level is read, the vertical scanning circuit 211 supplies the high-level downstream reset signal rstb over a pulse period while keeping the FD reset signal rst1 or rst2 and the downstream selection signal selb of the selected row at the high level. Therefore, the level of the downstream node 360 is initialized. At this time, the selection transistors 351, 352, 356, and 357 are in an open state, and the capacitive elements 331, 332, 336, and 337 are disconnected from the downstream node 360.

After the downstream node 360 is initialized, the vertical scanning circuit 211 supplies the high-level selection signal Φs1 or Φs2 over a predetermined period while keeping the FD reset signal (rst1 or rst2) and the downstream selection signal selb of the selected row at the high level. Therefore, the capacitive element 332 or 337 is connected to the downstream node 360 so that the signal level is read.

Under the above-described reading control, the selection circuit 350 of the selected row sequentially performs control to connect the capacitive element 331 to the downstream node 360, control to disconnect the capacitive elements 331 and 332 from the downstream node 360, and control to connect the capacitive element 332 to the downstream node 360.

Furthermore, the selection circuit 355 of the selected row sequentially performs control to connect the capacitive element 336 to the downstream node 360, control to disconnect the capacitive elements 336 and 337 from the downstream node 360, and control to connect the capacitive element 337 to the downstream node 360.

Furthermore, when the capacitive elements 331, 332, 336, and 337 are disconnected from the downstream node 360, the downstream reset transistor 361 of the selected row initializes the level of the downstream node 360. Furthermore, the downstream circuit 370 of the selected row sequentially reads the reset level and the signal level from the capacitive elements 331 and 332 (or the capacitive elements 336 and 337) via the downstream node 360 and outputs the read reset level and the signal level to the vertical signal line 309.

[Configuration Example of Column Signal Processing Circuit]

Figure 5:
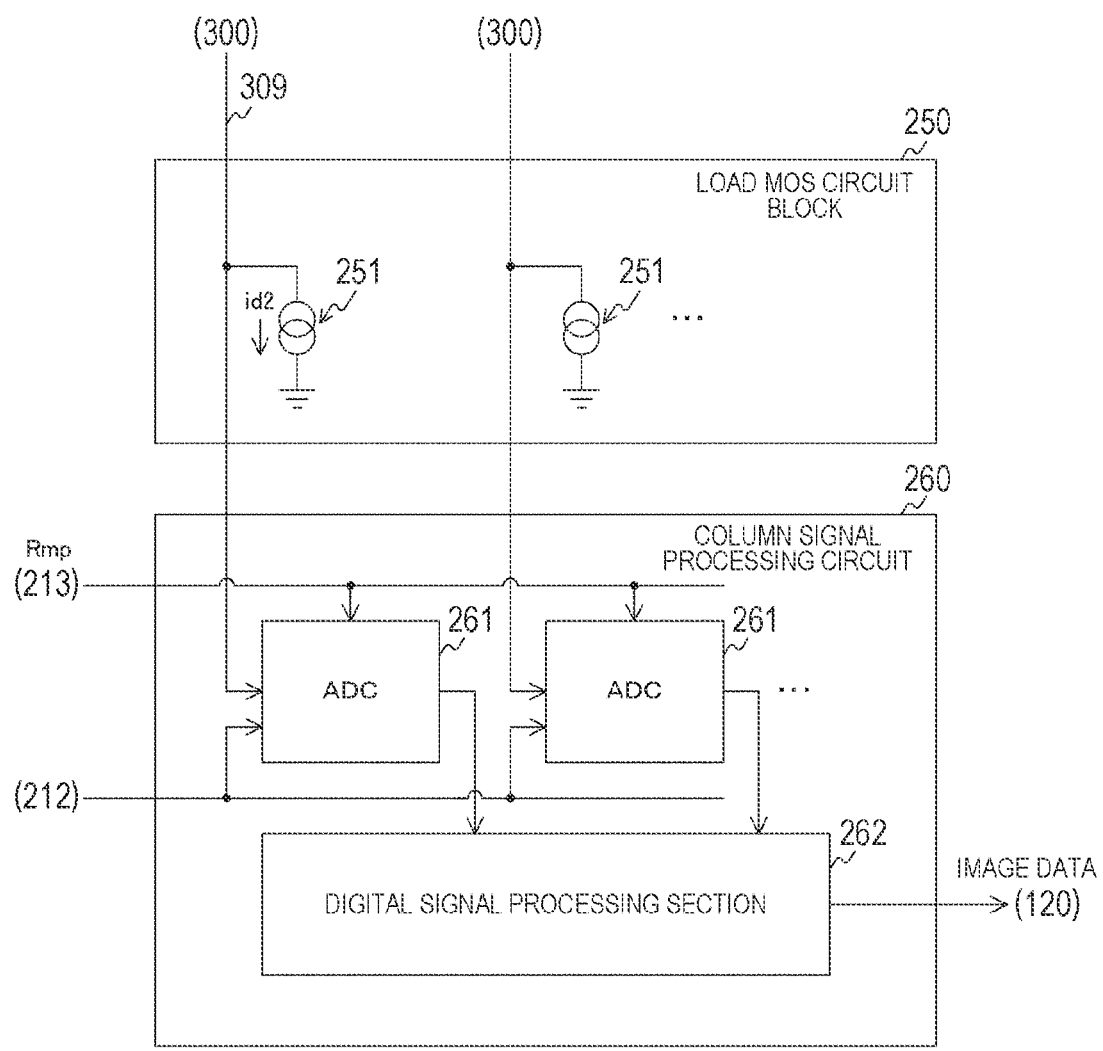
FIG. 5 is a block diagram depicting a configuration example of a column signal processing circuit in the first embodiment of the present technology.

FIG. 5 is a block diagram depicting a configuration example of the column signal processing circuit 260 in the first embodiment of the present technology.

In the load MOS circuit block 250, the vertical signal line 309 is wired for every column of the pixel blocks 300. When the number of columns is I (I is an integer), I vertical signal lines 309 are wired. Furthermore, a load MOS transistor 251 that supplies a constant current id2 is connected to each of the vertical signal lines 309.

In the column signal processing circuit 260, a plurality of ADCs 261 and a digital signal processing section 262 are arranged. The ADC 261 is arranged for every column. When the number of columns is I, I ADCs 261 are arranged.

The ADC 261 converts an analog pixel signal from a corresponding column into a digital signal using a ramp signal Rmp from the DAC 213. The ADC 261 supplies the digital signal to the digital signal processing section 262. For example, a single-slope ADC including a comparator and a counter is arranged as the ADC 261.

The digital signal processing section 262 performs predetermined signal processing such as CDS processing on each of the digital signals for every column. The digital signal processing section 262 supplies image data including the processed digital signal to the recording unit 120.

[Operation Example of Solid-State Imaging Element]

Figure 6:
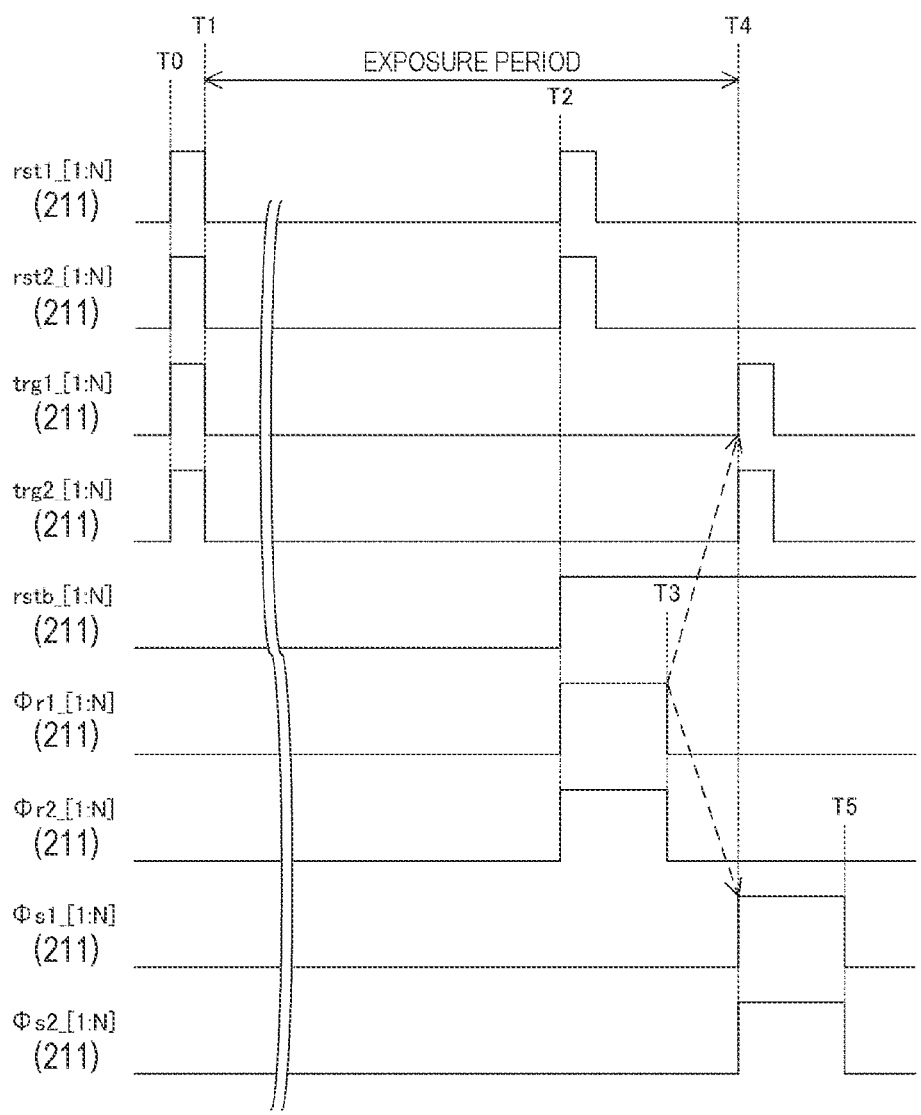
FIG. 6 is a timing chart depicting an example of a global shutter operation in the first embodiment of the present technology.

FIG. 6 is a timing chart depicting an example of a global shutter operation in the first embodiment of the present technology. The vertical scanning circuit 211 supplies the high-level FD reset signals rst1 and rst2 and transfer signals trg1 and trg2 to all the rows (in other words, all the pixels) from a timing T0 immediately before the exposure start to a timing T1 after a lapse of a pulse period. Therefore, all the pixels are subjected to the PD reset, and the exposure is simultaneously started in all the rows.

Here, rst1_[n], rst2_[n], trg1_[n], and trq2_[n] in the drawing indicate signals with respect to pixels in the n-th row among N rows. N is an integer indicating the total number of rows in which the pixel blocks 300 are arrayed, and n is an integer from one to N. In a case where two pixels in the pixel block 300 are pixels in an even row and an odd row, the n-th row of the pixel block 300 includes two rows, that is, an odd row and an even row.

At a timing T2 immediately before the end of an exposure period, the vertical scanning circuit 211 supplies the high-level FD reset signals rst1 and rst2 over a pulse period while setting the downstream reset signal rstb and the selection signals Φr1 and Φr2 to the high level in all the rows. Therefore, all the pixels are subjected to the FD reset, and the reset level is sampled and held. Here, rstb_[n], Φr1_[n], and Φr2_[n] in the drawing indicate signals with respect to the pixels in the n-th row.

At a timing T3 after the timing T2, the vertical scanning circuit 211 returns the selection signals Φr1 and Φr2 to a low level.

At an exposure end timing T4, the vertical scanning circuit 211 supplies the high-level transfer signals trg1 and trg2 over a pulse period while setting the downstream reset signal rstb and the selection signals Φs1 and Φs2 to the high level in all the rows. Therefore, the signal level is sampled and held. Furthermore, Φs1_[n] and Φs2_[n] in the drawing indicate signals with respect to the pixels in the n-th row.

At a timing T5 after the timing T4, the vertical scanning circuit 211 returns the selection signals Φs1 and Φs2 to the low level.

Figure 7:
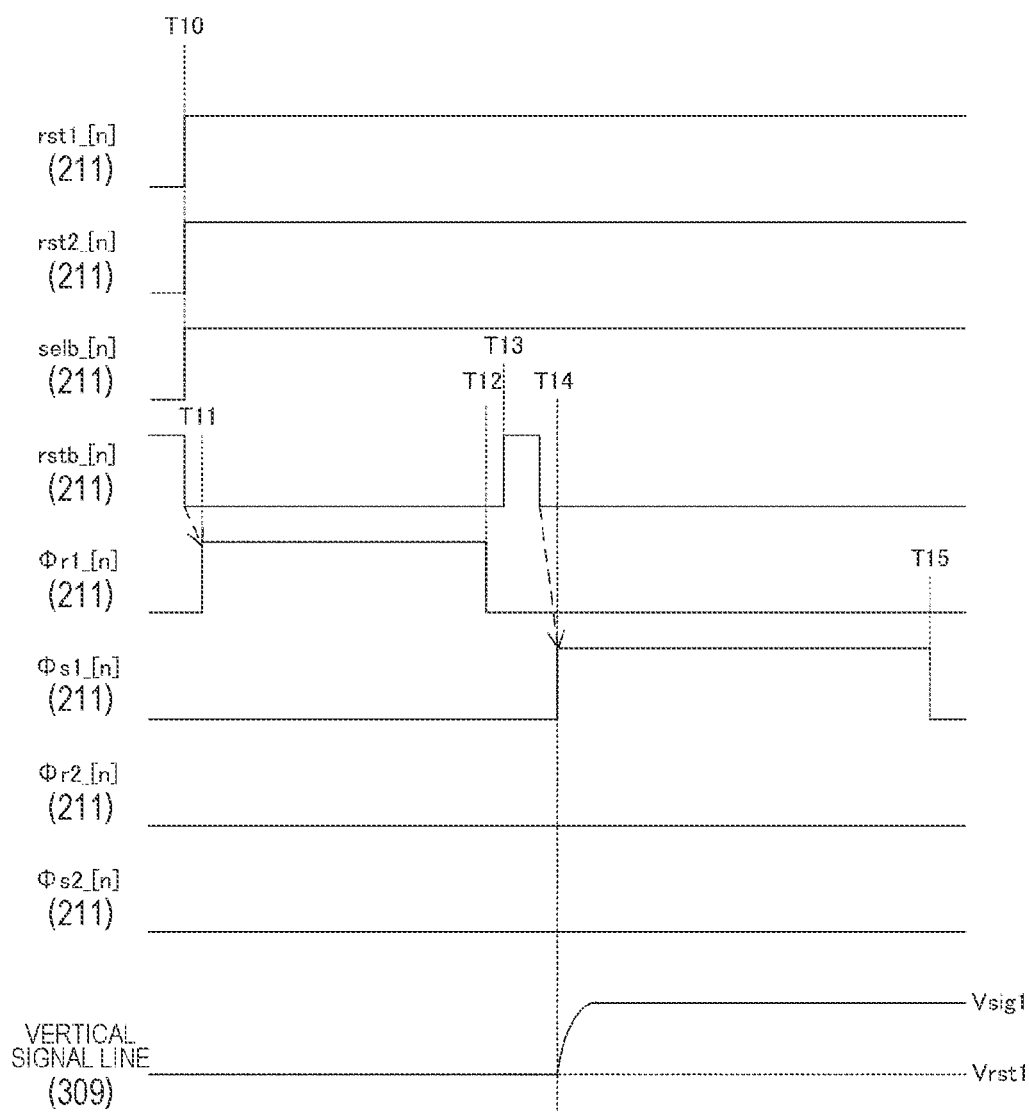
FIG. 7 is a timing chart depicting an example of a reading operation of the first pixel in a pixel block in the first embodiment of the present technology.

FIG. 7 is a timing chart depicting an example of a reading operation of the first pixel the pixel block 300 in the first embodiment of the present technology. The vertical scanning circuit 211 sets the FD reset signals rst1 and rst2 and the downstream selection signal selb of the n-th row to the high level in a reading period of the n-th row from a timing T10. Furthermore, the downstream reset signals rstb of all the rows are controlled to the low level at the timing T10. Here, selb_[n] in the drawing indicates a signal with respect to the pixels in the n-th row.

The vertical scanning circuit 211 supplies the high-level selection signal Φr1 to the n-th row over a period from a timing T11 immediately after the timing T10 to a timing T12. The potential of the downstream node 360 becomes a reset level Vrst1. The ADC 261 performs AD conversion on this reset level.

The vertical scanning circuit 211 supplies the high-level downstream reset signal rstb to the n-th row over a pulse period from a timing T13 immediately after the timing T12. Therefore, when a parasitic capacitance exists in the downstream node 360, a history of a previous signal held in the parasitic capacitance can be erased.

The vertical scanning circuit 211 supplies the high-level selection signal Φs1 to the n-th row over a period from a timing T14 immediately after the initialization of the downstream node 360 to a timing T15. The potential of the downstream node 360 becomes a signal level Vsig1. The ADC 261 performs AD conversion on this signal level. A difference between the reset level Vrst1 and the signal level Vsig1 corresponds to a net signal level from which reset noise and offset noise of the FD have been removed.

Figure 8:
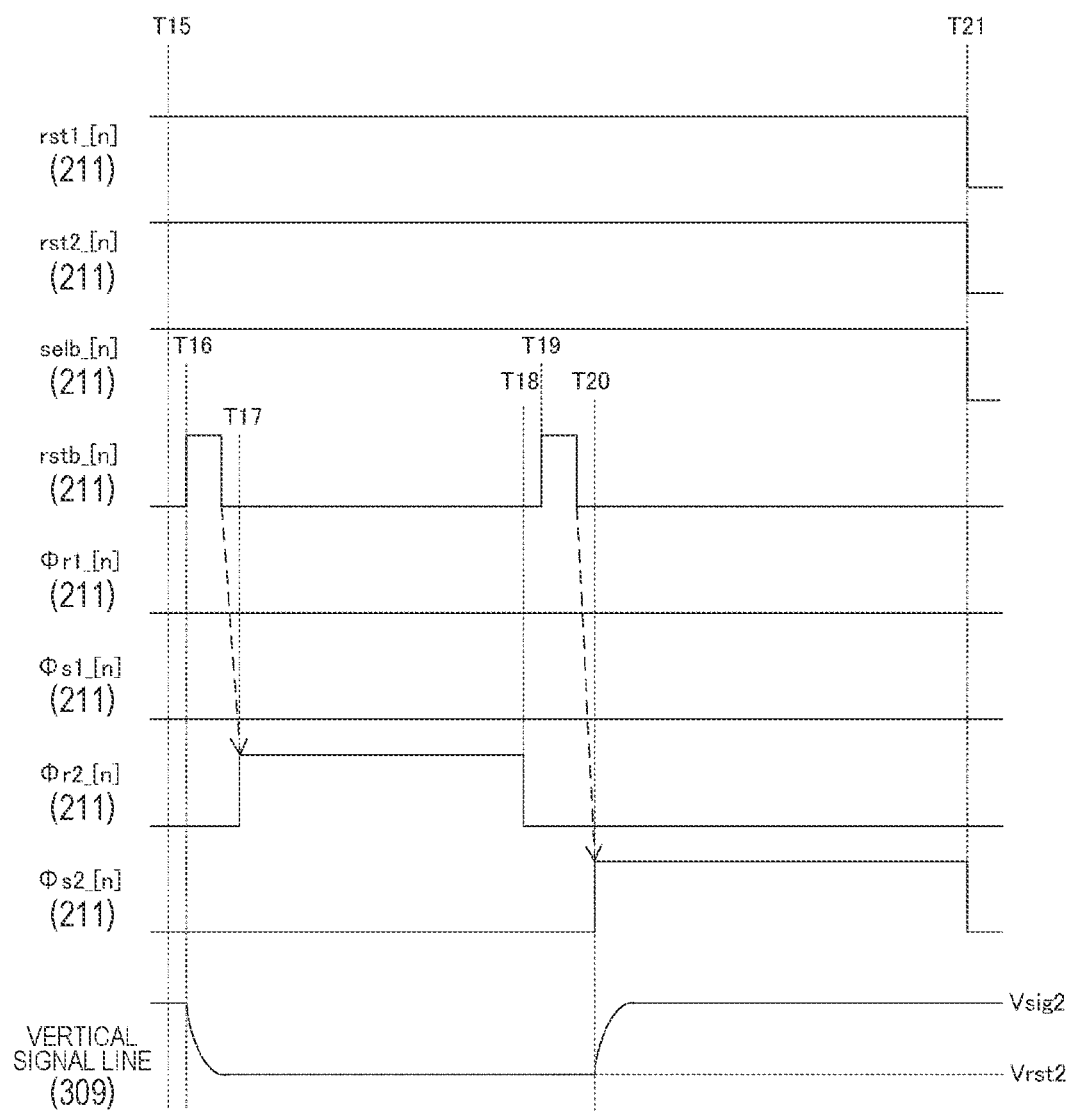
FIG. 8 is a timing chart depicting an example of a reading operation of the second pixel in the pixel block in the first embodiment of the present technology.

FIG. 8 is a timing chart depicting an example of the reading operation of the first pixel in the pixel block 300 in the first embodiment of the present technology.

The vertical scanning circuit 211 supplies the high-level downstream reset signal rstb to the n-th row over a pulse period from a timing T16 immediately after the timing T15.

The vertical scanning circuit 211 supplies a high-level selection signal Φr2 to the n-th row over a period from timing T17 immediately after initialization of the downstream node 360 to timing T18. The potential of the downstream node 360 becomes a reset level Vrst2. The ADC 261 performs AD conversion on this reset level.

The vertical scanning circuit 211 supplies the high-level downstream reset signal rstb to the n-th row over a pulse period from a timing T19 immediately after the timing T18.

The vertical scanning circuit 211 supplies the high-level selection signal Φs2 to the n-th row over a period from a timing T20 immediately after the initialization of the downstream node 360 to a timing T21. The potential of the downstream node 360 becomes a signal level Vsig2. The ADC 261 performs AD conversion on this signal level.

Furthermore, at the timing T21, the vertical scanning circuit 211 returns the FD reset signals rst1 and rst2 and the downstream selection signal selb of the n-th row to the low level.

The high-level selection signals Φr1, Φs1, Φr2, and Φs2 are sequentially supplied as illustrated in FIGS. 7 and 8. In accordance with these selection signals, the selection section 340 sequentially connects the capacitive elements 331, 332, 336, and 337 to the downstream node 360. Then, the reset level Vrst1 and the signal level Vsig1 of the first pixel and the reset level Vrst2 and the signal level Vsig2 of the second pixel in the pixel block 300 are sequentially read.

Incidentally, the solid-state imaging element 200 reads the signal level after the reset level, but is not limited to this order. The solid-state imaging element 200 can also read the reset level after the signal level. In this case, the vertical scanning circuit 211 supplies a high-level selection signal Φr after a high-level selection signal Φs. Furthermore, it is necessary to reverse an inclination of a slope of the ramp signal in this case.

Figure 9:
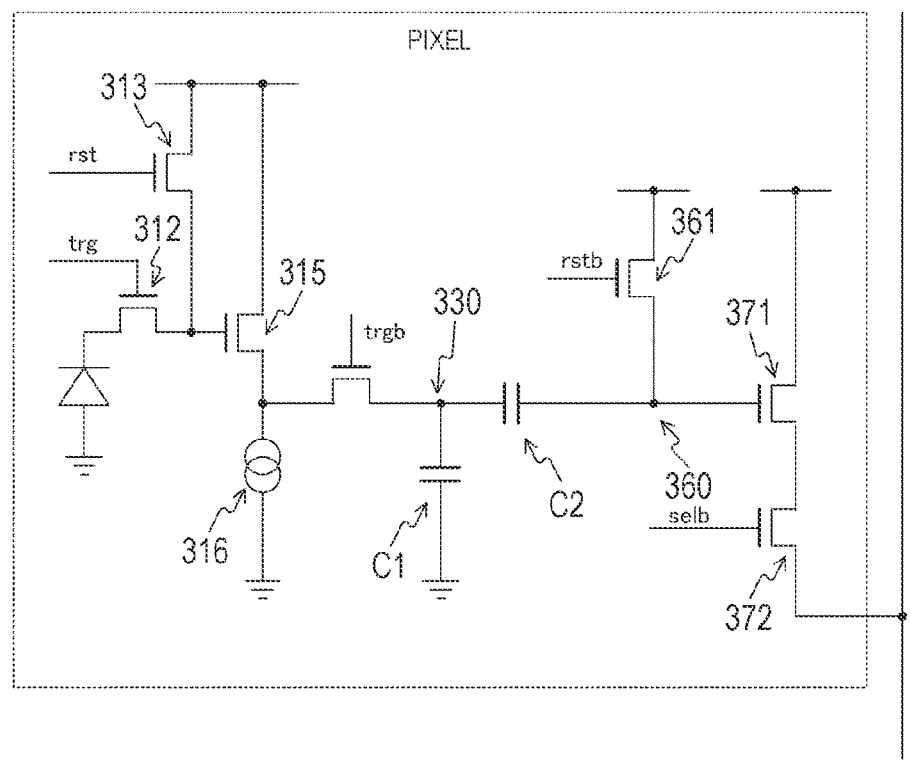
FIG. 9 is a circuit diagram depicting a configuration example of a pixel in a comparative example.

FIG. 9 is a circuit diagram depicting a configuration example of a pixel in a comparative example. In this comparative example, no selection circuit 350 is provided, and a transfer transistor is inserted between an upstream node 330 and an upstream circuit. Furthermore, capacitors C1 and C2 are inserted instead of the capacitive elements 331 and 332. The capacitor C1 is inserted between the upstream node 330 and a ground terminal, and the capacitor C2 is inserted between the upstream node 330 and a downstream node 360.

Exposure control and reading control of the pixel in this comparative example are described in FIG. 5.5.2 of Non-Patent Document 1, for example. Assuming that a capacitance value of each of the capacitors C1 and C2 is C in this comparative example, a level Vn of kTC noise at the time of exposure and reading is expressed by the following formula.

$$Vn=(3*kT/C)^{1/2} \qquad \text{Formula 1}$$

In the above formula, k is a Boltzmann constant, and the unit is, for example, Joule per Kelvin (J/K). T is an absolute temperature, and the unit is, for example, Kelvin (K). Furthermore, the unit of Vn is, for example, volt (V), and the unit of C is, for example, farad (F).

FIG. 10 is a diagram depicting examples of states of the pixel block at the time of reading the reset level and at the time of initializing the downstream node in the first embodiment of the present technology. In the drawing, a indicates the state of the pixel block 300 at the time of reading the reset level, and b in the drawing indicates the state of the pixel block 300 at the time of initializing the downstream node 360. Furthermore, in the drawing, the selection transistor 351, the selection transistor 352, and the downstream reset transistor 361 are represented by graphical symbols of switches for convenience of the description.

As illustrated in a of the drawing, the vertical scanning circuit 211 sets the selection transistor 351 in a closed state and sets the selection transistor 352 and the downstream reset transistor 361 the open state. Therefore, the reset level of the first pixel is read via the downstream circuit 370.

After reading the reset level, the vertical scanning circuit 211 sets the selection transistor 351 and the selection transistor 352 in the open state and sets the downstream reset transistor 361 in the closed state as illustrated in b of the drawing. Therefore, the capacitive elements 331 and 332 are disconnected from the downstream node 360, and the level of the downstream node 360 is initialized.

A capacitance value of a parasitic capacitance Cp of the downstream node 360 in the state of being disconnected from the capacitive elements 331 and 332 in this manner is set to be extremely smaller than those of the capacitive elements 331 and 332. For example, assuming that the parasitic capacitance Cp is several femtofarads (fF), the capacitive elements 331 and 332 are on the order of several tens of femtofarads.

Figure 11:
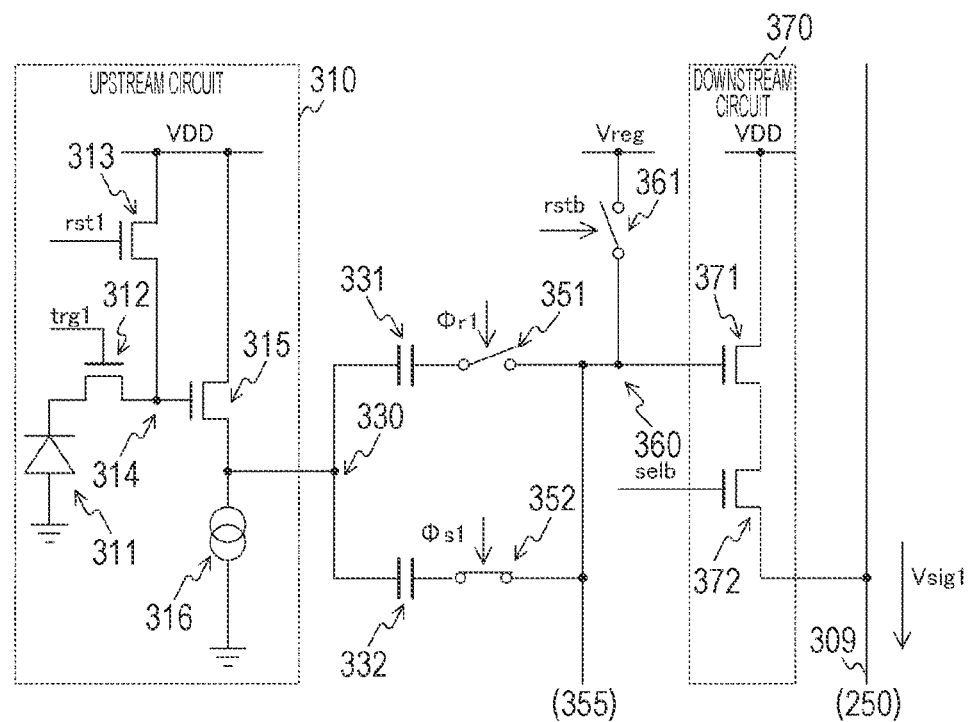
FIG. 11 is a diagram depicting an example of a state of the pixel block at the time of reading a signal level in the first embodiment of the present technology.

FIG. 11 is a diagram depicting an example of a state of the pixel block 300 at the time of reading the signal level in the first embodiment of the present technology.

After the initialization of the downstream node 360, the vertical scanning circuit 211 sets the selection transistor 352 in the closed state and sets the selection transistor 351 and the downstream reset transistor 361 in the open state. Therefore, the signal level of the first pixel is read via the downstream circuit 370.

Here, kTC noise at the time of pixel exposure is considered. At the time of exposure, the kTC noise occurs in each of sampling of the reset level and sampling of the signal level immediately before the exposure end. Assuming that a capacitance value of each of the capacitive elements 331 and 332 is C, the level Vn of the kTC noise at the time of exposure is expressed by the following formula.

$$Vn=(2*kT/C)^{1/2} \qquad \text{Formula 2}$$

Furthermore, the downstream reset transistor 361 is driven at the time of reading as illustrated in FIGS. 10 and 11, and thus, the kTC noise occurs at that time. However, the capacitive elements 331 and 332 are disconnected at the time of driving the downstream reset transistor 361, and the parasitic capacitance Cp at that time is small. Therefore, the kTC noise at the time of reading can be ignored as compared with the RTC noise at the time of exposure. Therefore, the kTC noise at the time of exposure and reading is expressed by Formula 2.

From Formulas 1 and 2, the kTC noise in the pixel block 300 in which the capacitor is disconnected at the time of reading is smaller than that in the comparative example in which the capacitor is not disconnectable at the time of reading. Therefore, the image quality of image data can be improved.

Furthermore, since the two pixels in the pixel block 300 share the downstream reset transistor 361 and the downstream circuit 370, the circuit scale of the pixel array section 220 can be reduced as compared with a case where the downstream reset transistor 361 and the downstream circuit 370 are not shared. Incidentally, the number of pixels to be shared is not limited to two pixels. Three or more pixels can also share the downstream reset transistor 361 and the downstream circuit 370.

Figure 12:
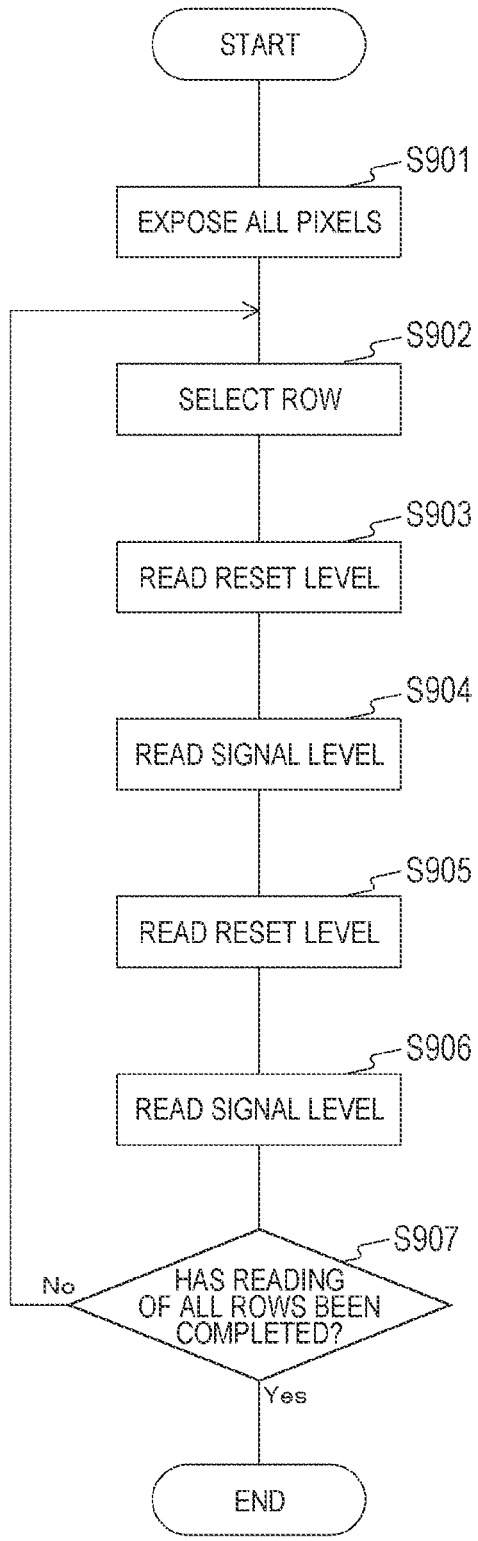
FIG. 12 is a flowchart depicting an example of an operation of the solid-state imaging element in the first embodiment of the present technology.

FIG. 12 is a flowchart depicting an example of an operation of the solid-state imaging element 200 in the first embodiment of the present technology. This operation is started, for example, when a predetermined application for imaging image data is executed.

The vertical scanning circuit 211 exposes all the pixels (step S901). Then, the vertical scanning circuit 211 selects a row of the pixel block 300 to be read (step S902). The column signal processing circuit 260 reads the reset level of the first pixel in the pixel block 300 of the row (step S903), and then reads the signal level of the pixel (step S904). Subsequently, the column signal processing circuit 260 reads the reset level of the second pixel (step S905), and then reads the signal level of the pixel (step S906).

The solid-state imaging element 200 determines whether or not reading of all rows has been completed (step S907). In a case where the reading of all the rows has not been completed (Step S907: No), the solid-state imaging element 200 repeats Step S902 and the subsequent steps. On the other hand, in a case where the reading of all the rows has been completed (step S907: Yes), the solid-state imaging element 200 executes CDS processing or the like, and ends the operation for imaging. In a case where a plurality of pieces of image data is continuously imaged, steps S901 to S907 are repeatedly executed in synchronization with the vertical synchronization signal.

In this manner, the downstream reset transistor 361 initializes the downstream node 360 when the selection circuit 350 disconnects the capacitive elements 331 and 332 from the downstream node 360 in the first embodiment of the present technology. Since the capacitive elements 331 and 332 are disconnected, a level of reset noise caused by driving of the downstream reset transistor 361 becomes a level corresponding to a parasitic capacitance smaller than capacitances thereof. This noise reduction can improve the image quality of image data.

Furthermore, since the two pixels share the downstream reset transistor 361 and the downstream circuit 370, the circuit scale of the pixel array section 220 can be reduced as compared with a case where the downstream reset transistor 361 and the downstream circuit 370 are not shared.

[First Modification]

Although the solid-state imaging element 200 sequentially reads the respective pixel signals of the two pixels in the pixel block 300 in the first embodiment described above, there is a possibility that reading speed is insufficient in this configuration. The solid-state imaging element 200 of the first modification of the first embodiment is different from that of the first embodiment in that pixel addition is performed.

Figure 13:
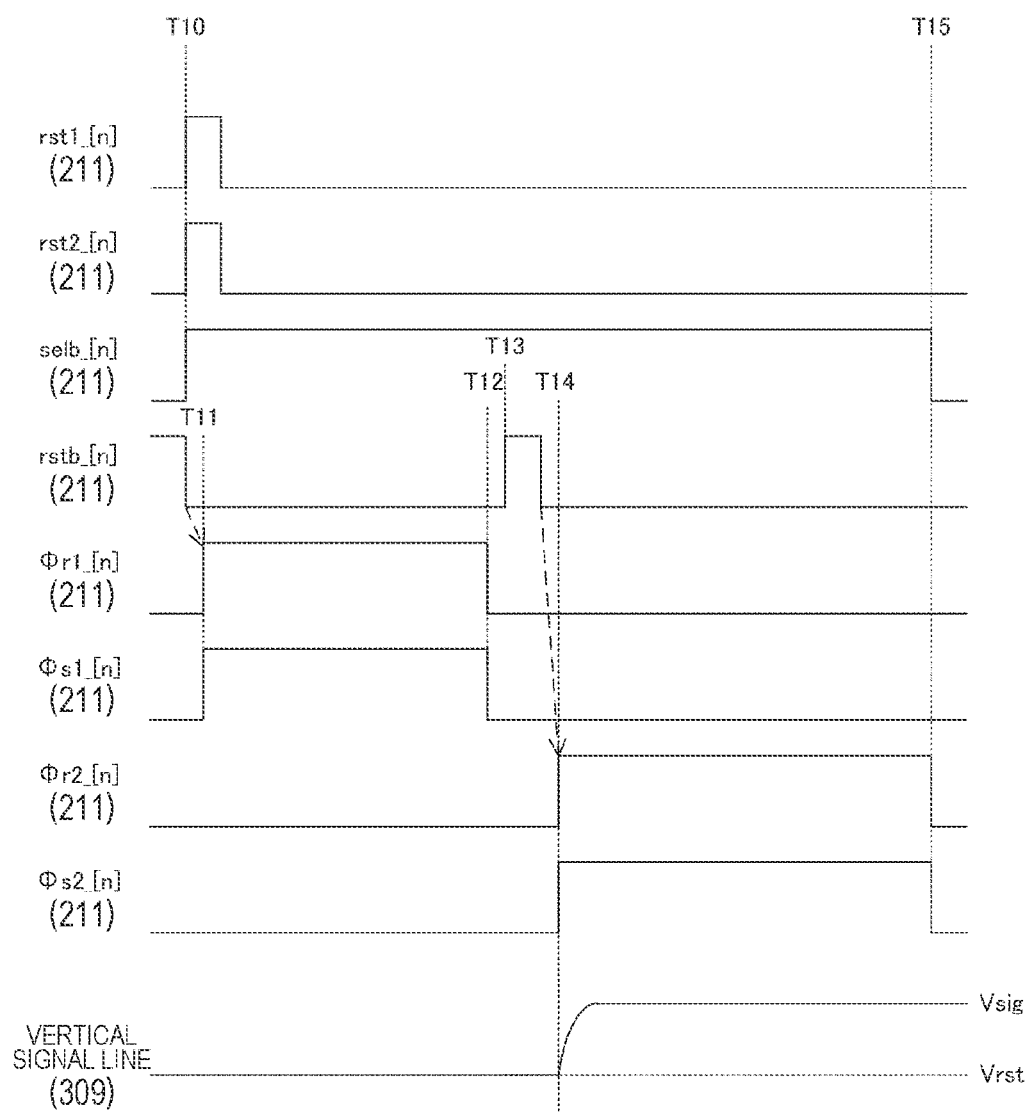
FIG. 13 is a timing chart depicting an example of an operation of reading a reset level and a signal level in a first modification of the first embodiment of the present technology.

FIG. 13 is a timing chart depicting an example of an operation of reading a reset level and a signal level in the first modification of the first embodiment of the present technology. Any of a plurality of modes including a non-addition mode in which the pixel addition is not performed and an addition mode in which the pixel addition is performed is set in the solid-state imaging element 200 of the first embodiment. A global shutter operation and a reading operation in the non-addition mode are similar to those in the first embodiment. A global shutter operation in the addition mode is similar to that in the non-addition mode.

In a case where reading is performed in the addition mode, the vertical scanning circuit 211 supplies high-level FD reset signals rst1 and rst2 over a pulse period at a timing T10 of the start of reading of the n-th row as illustrated in the drawing. Furthermore, the vertical scanning circuit 211 sets a downstream selection signal selb to the high level within a reading period from the timing T10 to a timing T15.

The vertical scanning circuit 211 supplies high-level selection signals Φr1 and Φs2 to the n-th row over a period from the timing T11 immediately after the timing T10 to the timing T12. Therefore, a potential of the downstream node 360 becomes a reset level Vrst. This reset level Vrst is a value obtained by adding reset levels of the two pixels in the pixel block 300.

The vertical scanning circuit 211 supplies the high-level downstream reset signal rstb to the n-th row over a pulse period from a timing T13 immediately after the timing T12.

The vertical scanning circuit 211 supplies high-level selection signals Φr2 and Φs2 to the n-th row over a period from the timing T14 to the timing T15 immediately after initialization of the downstream node 360. Therefore, the potential of the downstream node 360 becomes a signal level Vsig. The signal level Vsig is a value obtained by adding signal levels of the two pixels in the pixel block 300.

As illustrated in the drawing, the high-level selection signals Φr1 and Φs1 are supplied, and the selection section 340 connects the capacitive elements 331 and 336 to the downstream node 360 in accordance with these selection signals. In other words, the capacitive element 331 and the capacitive element 336 are short-circuited. Therefore, the reset levels of the two pixels are added. Furthermore, the high-level selection signals Φr2 and Φs2 are supplied, and the selection section 340 connects the capacitive elements 332 and 337 to the downstream node 360 in accordance with these selection signals. In other words, the capacitive element 332 and the capacitive element 337 are short-circuited. Therefore, the signal levels of the two pixels are added Through these kinds of the pixel addition, sensitivity and reading speed can be improved as compared with a case where addition is not performed. Furthermore, the number of rows to be read is reduced by the pixel addition, and thus, power consumption can be reduced.

Incidentally, the solid-state imaging element 200 reads the signal level after the reset level, but is not limited to this order, and can also read the reset level after the signal level.

In this manner, since the selection section 340 connects the capacitive elements 331 and 336 to the downstream node 360 and connects the capacitive elements 332 and 337 to the downstream node 360 according to the first modification of the first embodiment of the present technology, it is possible to add the respective pixel signals of the two pixels. Therefore, the sensitivity and the reading speed can be improved and the power consumption can be reduced as compared with the case where the addition is not performed.

[Second Modification]

Although the circuits in the solid-state imaging element 200 are provided on the single semiconductor chip in the first embodiment described above, there is a possibility that the elements do not fit in the semiconductor chip when the pixel miniaturized in this configuration. The solid-state imaging element 200 of a second modification of the first embodiment is different from that of the first embodiment in that circuits in the solid-state imaging element 200 are dispersedly arranged on two semiconductor chips.

Figure 14:
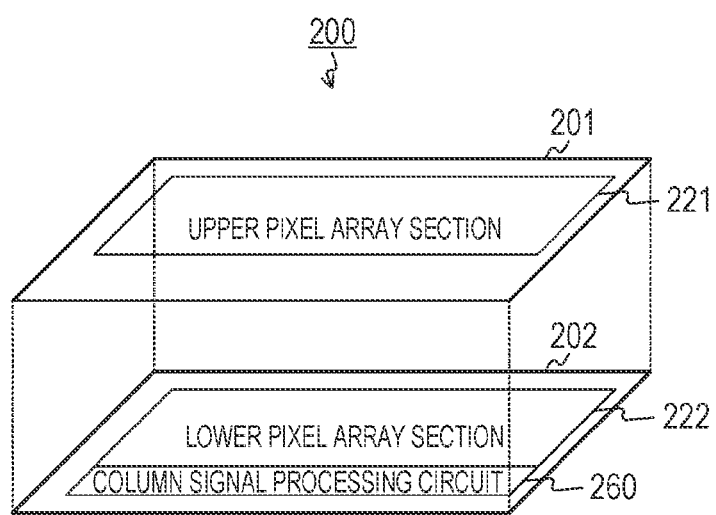
FIG. 14 is a diagram depicting an example of a stacked structure of a solid-state imaging element in a second modification of the first embodiment of the present technology.

FIG. 14 is a diagram depicting an example of a stacked structure of the solid-state imaging element 200 in the second modification of the first embodiment of the present technology. The solid-state imaging element 200 in the second modification of the first embodiment includes a lower pixel chip 202 and an upper pixel chip 201 stacked on the lower pixel chip 202. These chips are electrically connected by, for example, Cu—Cu bonding. Incidentally, the connection can be made by a via or a bump other than the Cu—Cu bonding.

An upper pixel array section 221 arranged on the upper pixel chip 201. A lower pixel array section 222 and the column signal processing circuit 260 are arranged on the lower pixel chip 202. For each pixel in the pixel array section 220, a part thereof is arranged in the upper pixel array section 221, and the remaining part is arranged in the lower pixel array section 222.

Furthermore, the vertical scanning circuit 211, the timing control circuit 212, the DAC 213, and the load MOS circuit block 250 are also arranged on the lower pixel chip 202. These circuits are not illustrated in the drawing.

Furthermore, the upper pixel chip 201 is manufactured, for example, by a pixel-dedicate process, and the lower pixel chip 202 is manufactured, for example, by a complementary MOS (CMOS) process. Incidentally, the upper pixel chip 201 is an example of a first chip described in the claims, and the lower pixel chip 202 is an example of a second chip described in the claims.

Figure 15:
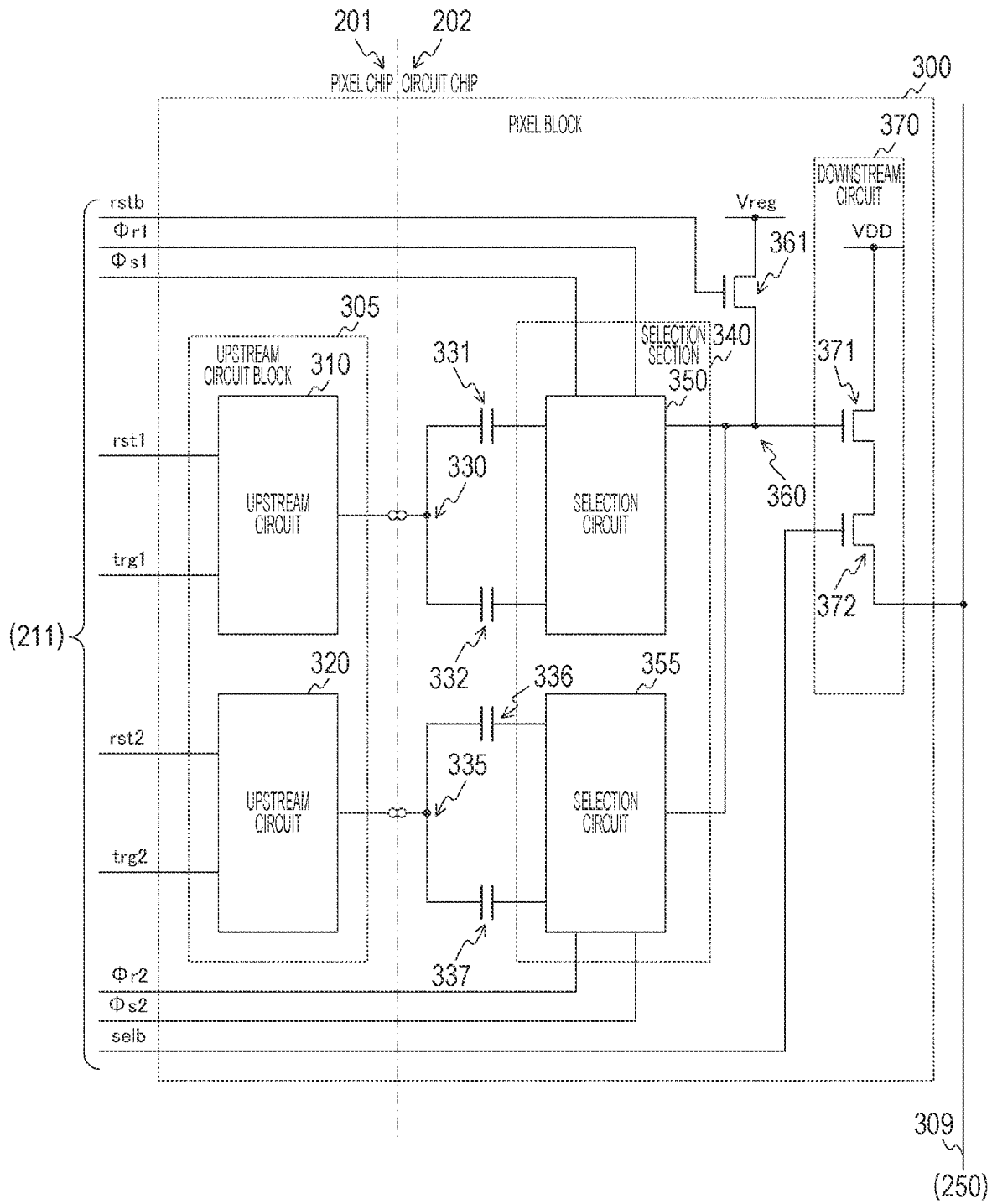
FIG. 15 is a circuit diagram depicting a configuration example of a pixel block in the second modification of the first embodiment of the present technology.

FIG. 15 is a circuit diagram depicting a configuration example of the pixel block 300 in the second modification of the first embodiment of the present technology. In the pixel block 300, an upstream circuit block 305 is arranged on the upper pixel chip 201, and the other circuits and elements (such as the capacitive elements 331 and 332) are arranged on the lower pixel chip 202. Incidentally, the current source transistors 316 and 326 can be further arranged on the lower pixel chip 202. Since the elements in the pixel block 300 are dispersedly arranged on the stacked upper pixel chip 201 and lower pixel chip 202 as illustrated in the drawing, the area of a pixel can be reduced, and miniaturization of the pixel is facilitated.

In this manner, since the circuits and elements in the pixel block 300 are dispersedly arranged on the two semiconductor chips according to the second modification of the first embodiment of the present technology, the miniaturization of the pixel is facilitated.

[Third Modification]

In the second modification of the first embodiment described above, a part of the pixel block 300 and a peripheral circuit (such as the column signal processing circuit 260) are provided on the lower pixel chip 202 on the lower side. However, in this configuration, the arrangement area of the circuits and elements on the lower pixel chip 202 side is larger than that of the upper pixel chip 201 by the peripheral circuit, and there is a possibility that an unnecessary space including no circuit and element is generated in the upper pixel chip 201. The solid-state imaging element 200 of a third modification of the first embodiment is different from that of the second modification of the first embodiment in that circuits in the solid-state imaging element 200 are dispersedly arranged on three semiconductor chips.

Figure 16:
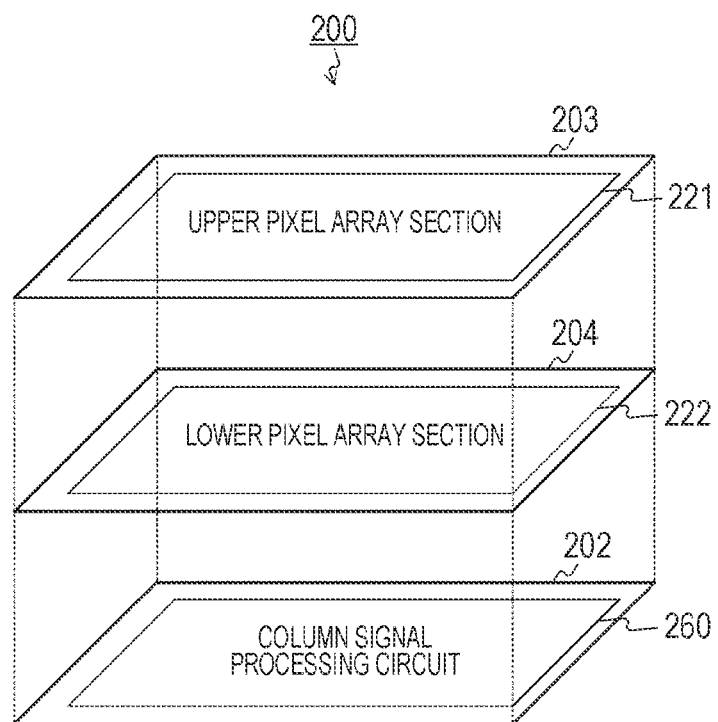
FIG. 16 is a diagram depicting an example of a stacked structure of a solid-state imaging element in a third modification of the first embodiment of the present technology.

FIG. 16 is a diagram depicting an example of a stacked structure of the solid-state imaging element 200 in the third modification of the first embodiment of the present technology. The solid-state imaging element 200 of the third modification of the first embodiment includes the upper pixel chip 201, the lower pixel chip 202, and a circuit chip 203. These chips are stacked and electrically connected by, for example, Cu—Cu bonding. Incidentally, the connection can be made by a via or a bump other than the Cu—Cu bonding.

An upper pixel array section 221 is arranged on the upper pixel chip 201. The lower pixel array section 222 is arranged on the lower pixel chip 202. For each pixel in the pixel array section 220, a part thereof is arranged in the upper pixel array section 221, and the remaining part is arranged in the lower pixel array section 222.

Furthermore, the column signal processing circuit 260, the vertical scanning circuit 211, the timing control circuit 212, the DAC 213, and the load MOS circuit block 250 are arranged on the circuit chip 203. Circuits other than the column signal processing circuit 260 are not illustrated in the drawing.

Incidentally, the upper pixel chip 201 is an example of a first chip described in the claims, and the lower pixel chip 202 is an example of a second chip described in the claims. The circuit chip 202 is an example of a third chip described in the claims.

Since the three-layer configuration as illustrated in the drawing is adopted, it is possible to reduce the unnecessary space and further miniaturize a pixel as compared with the two-layer configuration. Furthermore, the lower pixel chip 204 on the second layer can be manufactured by a dedicated process for a capacitor or a switch.

In this manner, since the circuits in the solid-state imaging element 200 are dispersedly arranged on the three semiconductor chips in the third modification of the first embodiment of the present technology, the pixel can be further miniaturized as compared with a case where the circuits are dispersedly arranged on two semiconductor chips.

2. Second Embodiment

Although the solid-state imaging element 200 sequentially reads the respective pixel signals of the two pixels in the pixel block 300 in the first embodiment described above, there is a possibility that reading speed is insufficient in this configuration. The solid-state imaging element 200 of the first modification of the first embodiment is different from that of the first embodiment in that pixel addition is performed.

FIG. 17 is a plan view depicting a configuration example of the pixel array section 220 in a second embodiment of the present technology. In the drawing, a is a plan view depicting an example of the pixel array section 220 in a Bayer array. In the drawing, b is a plan view depicting an example of the pixel array section 220 of a Quadra-Bayer array.

As illustrated in a of the drawing, red (R), green (G), and blue (B) pixels are arrayed in the Bayer array in the pixel array section 220 of the second embodiment. The solid-state imaging element 200 can add pixel signals of an R pixel 301 and R pixels 302 to 304 in the vicinity thereof among these pixels. Similarly, for the G pixel and the B pixel, the solid-state imaging element 200 can add the respective pixel signals of four neighboring pixels.

Incidentally, instead of the Bayer array, pixels may be arrayed in the Quadra-Bayer array as illustrated in b of the drawing. In the Quadra-Bayer array, four pixels of the same color are arrayed adjacent to each other in 2 rows×2 columns. Then, focusing on four R pixels, four B pixels are arranged at the lower right of the R pixels, and four G pixels are arranged at the right side and the lower side of the R pixels. The solid-state imaging element 200 can add pixel signals of adjacent four pixels (the pixels 301 to 304 and the like) of the same color among these pixels.

Incidentally, the array of the pixels is not limited to the Bayer array or the Quadra-Bayer array. For example, R, G, B, and W (white) pixels can be also arrayed.

Figure 18:
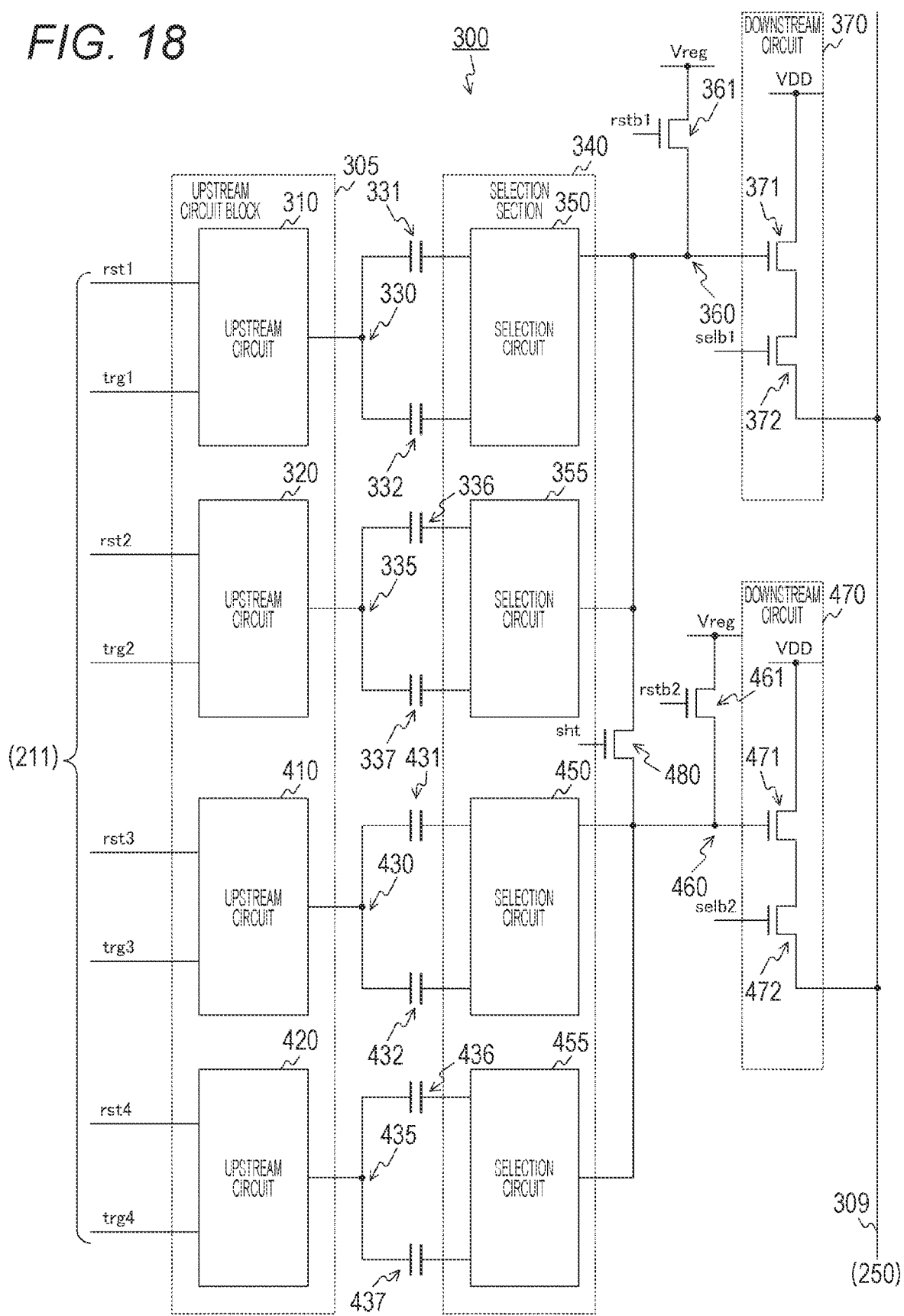
FIG. 18 is a circuit diagram depicting a configuration example of a pixel block in the second embodiment of the present technology.

FIG. 18 is a circuit diagram depicting a configuration example of the pixel block 300 in the second embodiment of the present technology. In the pixel block 300 of the second embodiment, four pixels to be added when pixel addition is performed are arranged. For example, the pixels 301 to 304 in FIG. 17 are arranged in the pixel block 300.

The pixel block. 300 of the second embodiment is further provided with capacitive elements 431, 432, 436, and 437, a short-circuit transistor 480, a downstream reset transistor 461, and a downstream circuit 470. Furthermore, in the second embodiment, upstream circuits 410 and 420 are further arranged in the upstream circuit block 305, and selection circuits 450 and 455 are further arranged in the selection section 340. The vertical scanning circuit 211 supplies a downstream reset signal rstb1 to the downstream reset transistor 361 and supplies a downstream reset signal rstb2 to the downstream reset transistor 461.

In the downstream circuit 470, a downstream amplification transistor 471 and a downstream selection transistor 472 are arranged. As these transistors, for example, nMOS transistors are used. Furthermore, circuit configurations of the downstream reset transistor 461 and the downstream circuit 470 are similar to those of the downstream reset transistor 361 and a downstream circuit 370. The downstream circuits 370 and 470 are connected to the same vertical signal line 309. The vertical scanning circuit 211 supplies a downstream selection signal selb1 to the downstream selection transistor 372 and supplies a downstream selection signal selb2 to the downstream selection transistor 472.

The upstream circuit 410 sequentially generates a reset level and a signal level and causes the capacitive elements 431 and 432 to hold the reset level and the signal level. The upstream circuit 420 sequentially generates a reset level and a signal level and causes the capacitive elements 436 and 437 to hold the reset level and the signal level. Incidentally, the capacitive elements 431 and 432 are examples of fifth and sixth capacitive elements described in the claims, and the capacitive elements 436 and 437 are examples of seventh and eighth capacitive elements described in the claims.

Furthermore, the selection circuit 450 connects any of the capacitive elements 431 and 432 to a downstream node 460, and the selection circuit 455 connects any of the capacitive elements 436 and 437 to the downstream node 460. Incidentally, the selection circuit 450 is an example of a third selection circuit described in the claims, and the selection circuit 455 is an example of a fourth selection circuit described in the claims. Furthermore, the downstream node 360 is an example of a first downstream node described in the claims, and the downstream node 460 is an example of a second downstream node described in the claims.

The short-circuit transistor 480 opens and closes a path between the downstream node 360 and the downstream node 460 in accordance with a short-circuit signal sht from the vertical scanning circuit 211. As the short-circuit transistor 480, for example, an nMOS transistor is used.

Figure 19:
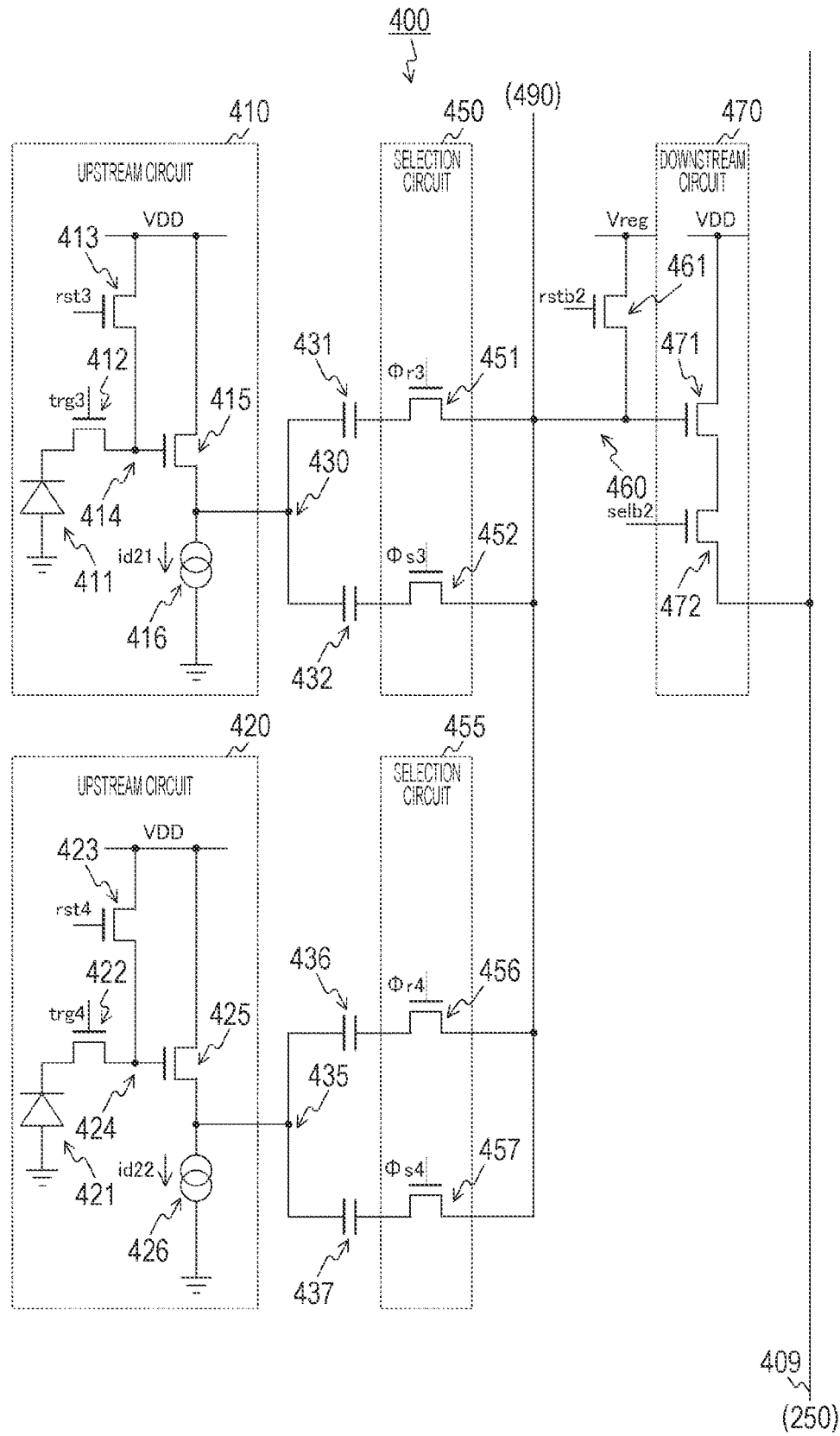
FIG. 19 is a circuit diagram depicting a configuration example of an upstream circuit and a selection circuit in the second embodiment of the present technology.

FIG. 19 is a circuit diagram depicting a configuration example of the upstream circuits 410 and 420 and the selection circuits 450 and 455 in the second embodiment of the present technology.

The upstream circuit 410 includes a photoelectric conversion element 411, a transfer transistor 412, an FD reset transistor 413, an FD 414, an upstream amplification transistor 415, and a current source transistor 416. The vertical scanning circuit 211 supplies a transfer signal trg3 and an FD reset signal rst3 to the transfer transistor 412 and the FD reset transistor 413.

Furthermore, the upstream circuit 420 includes a photoelectric conversion element 421, a transfer transistor 422, an FD reset transistor 423, an FD 424, an upstream amplification transistor 425, and a current source transistor 426. The vertical scanning circuit 211 supplies a transfer signal trg4 and an FD reset signal rst4 to the transfer transistor 422 and the FD reset transistor 423.

The selection circuit 450 includes selection transistors 451 and 452, and the selection circuit 455 includes selection transistors 456 and 457. The vertical scanning circuit 211 supplies selection signals $\Phi r3$ and $\Phi s3$ to the selection transistors 451 and 452, and supplies selection signals $\Phi r4$ and $\Phi s4$ to the selection transistors 456 and 457.

Circuit configurations of the upstream circuits 410 and 420 are similar to those of the upstream circuits 310 and 320. Furthermore, circuit configurations of the selection circuits 450 and 455 are similar to those of the selection circuits 350 and 355.

Figure 20:
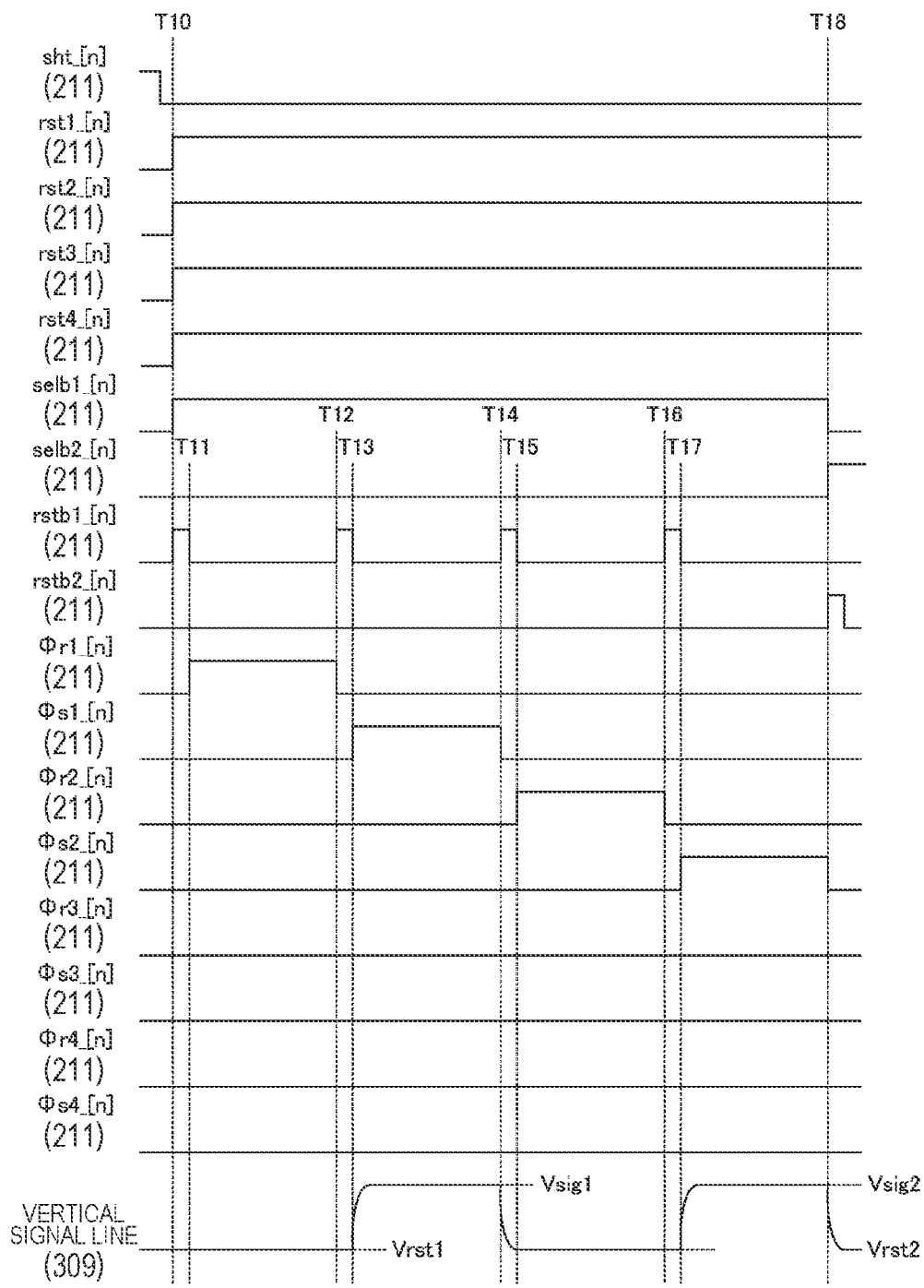
FIG. 20 is a timing chart depicting an example of a reading operation of the first and second pixels in a pixel block in the second embodiment of the present technology.

FIG. 20 is a timing chart depicting an example of a reading operation of the first and second pixels in the pixel block 300 in the second embodiment of the present technology. Any of a plurality of modes including a non-addition mode in which the pixel addition is not performed and an addition mode in which the pixel addition is performed is set in the solid-state imaging element 200 of the second embodiment. A global shutter operation and a reading operation in the non-addition mode are similar to those in the first embodiment. A global shutter operation in the addition mode is similar to that in the non-addition mode.

In the non-addition mode, the vertical scanning circuit 211 sets the short-circuit signal sht to the low level. Furthermore, the vertical scanning circuit 211 sets FD reset signals rst1 to rst4 to the high level at a timing T10 of the start of reading of the n-th row of the pixel block 300. Furthermore, the vertical scanning circuit 211 sets the downstream selection signal selb1 to the high level and sets the downstream selection signal selb2 to the low level in a period from the timing T10 to a timing T18.

Furthermore, the vertical scanning circuit 211 supplies the high-level downstream reset signal rstb1 within a pulse period from the timing T10 to the timing T11, and supplies a high-level selection signal $\Phi r1$ within a period from the timing T11 to the timing T12. In this period, a reset level Vrst1 of the first pixel is read via the vertical signal line 309.

The vertical scanning circuit 211 supplies the high-level downstream reset signal rstb1 in a pulse period from the timing T12 to the timing T13, and supplies a high-level selection signal $\Phi s1$ in a period from the timing T13 to the timing T14. In this period, a signal level Vsig1 of the first pixel is read via the vertical signal line 309.

Subsequently, the vertical scanning circuit 211 supplies the high-level downstream reset signal rstb1 in a pulse period from the timing T14 to the timing T15, and supplies a high-level selection signal $\Phi r2$ in a period from the timing T15 to the timing T16. In this period, a reset level Vrst2 of the second pixel is read via the vertical signal line 309.

The vertical scanning circuit 211 supplies the high-level downstream reset signal rstb1 in a pulse period from the timing T16 to the timing T17, and supplies a high-level selection signal $\Phi s2$ in a period from the timing T17 to the timing T18. In this period, a signal level Vsig2 of the second pixel is read via the vertical signal line 309.

Figure 21:
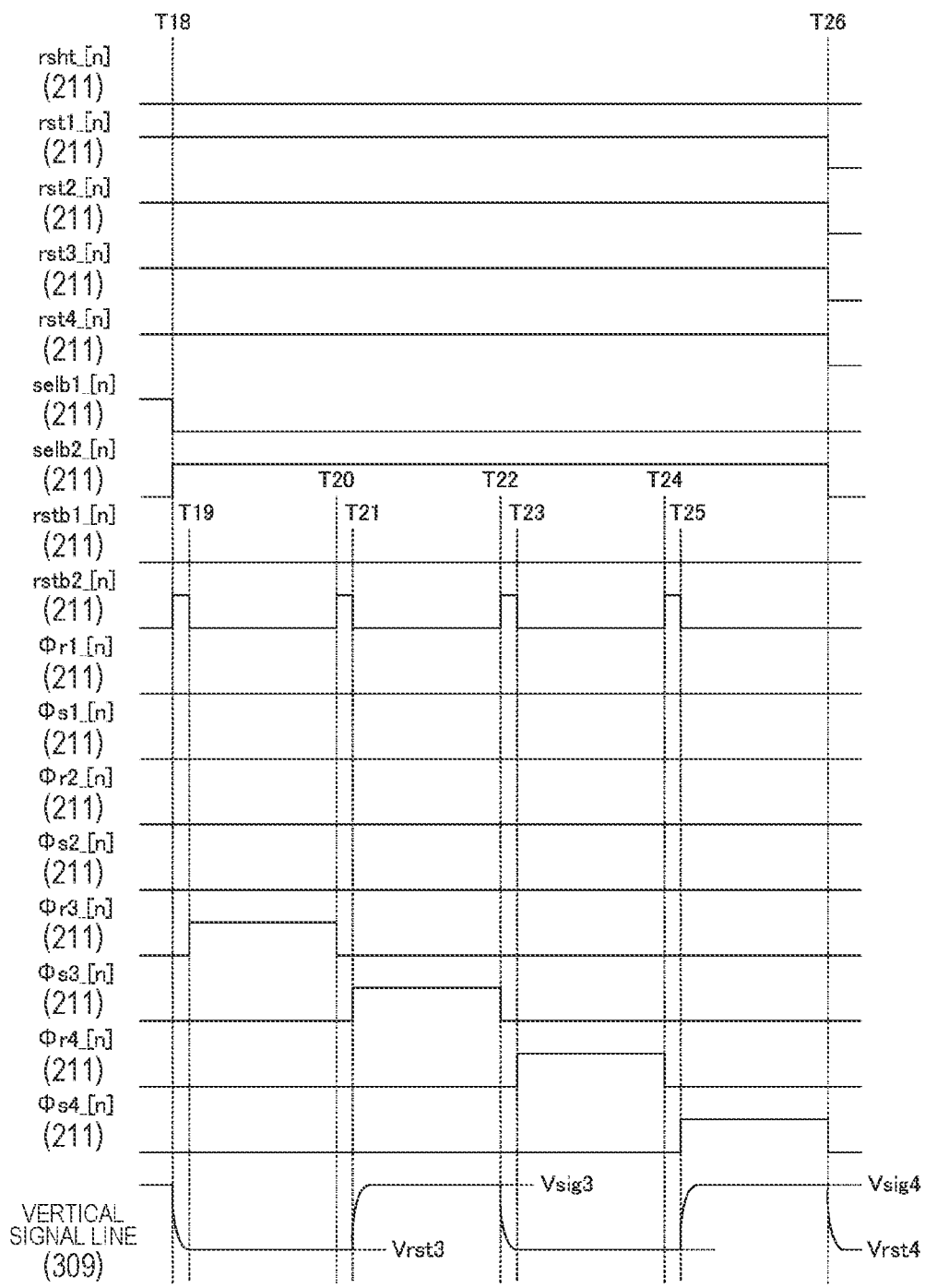
FIG. 21 is a timing chart depicting an example of a reading operation of the third and fourth pixels in the pixel block in the second embodiment of the present technology.

FIG. 21 is a timing chart depicting an example of a reading operation of the third and fourth pixels in the pixel block 300 in the second embodiment of the present technology.

The vertical scanning circuit 211 sets the downstream selection signal selb1 to the low level and sets the downstream selection signal selb2 to the high level in a period from a timing T18 to a timing T26.

Furthermore, the vertical scanning circuit 211 supplies the high-level downstream reset signal rstb2 in a pulse period from the timing T18 to the timing T19, and supplies the high-level selection signal $\Phi r3$ in a period from the timing T19 to the timing T20. In this period, a reset level Vrst3 of the third pixel is read via the vertical signal line 309.

The vertical scanning circuit 211 supplies the high-level downstream reset signal rstb2 in a pulse period from the timing T20 to the timing T21, and supplies the high-level selection signal $\Phi s3$ in a period from the timing T21 to the timing T22. During this period, a signal level Vsig3 of the third pixel is read via the vertical signal line 309.

Subsequently, the vertical scanning circuit 211 supplies the high-level downstream reset signal rstb2 in a pulse period from the timing T22 to the timing T23, and supplies the high-level selection signal $\Phi r4$ in a period from the timing T23 to the timing T24. In this period, a reset level Vrst4 of the fourth pixel is read via the vertical signal line 309.

The vertical scanning circuit 211 supplies the high-level downstream reset signal rstb2 in a pulse period from the timing T24 to the timing T25, and supplies the high-level selection signal $\Phi s4$ in a period from the timing T25 to the timing T26. During this period, a signal level Vsig4 of the fourth pixel is read via the vertical signal line 309.

Furthermore, the vertical scanning circuit 211 sets the FD reset signals rst1 to rst4 to the low level at a timing T26 of the end of the reading of the n-th row.

As illustrated in FIGS. 20 and 21, the short-circuit transistor 480 is controlled to an open state in the non-addition mode. Furthermore, the capacitive elements 331 and 332 are sequentially connected to the downstream node 360, and the reset level and the signal level of the first pixel are sequentially read. The capacitive elements 336 and 337 are sequentially connected to the downstream node 360, and the reset level and the signal level of the second pixel are sequentially read. Subsequently, the capacitive elements 431 and 432 are sequentially connected to the downstream node 460, and the reset level and the signal level of the third pixel are sequentially read. The capacitive elements 436 and 437 are sequentially connected to the downstream node 460, and the reset level and the signal level of the fourth pixel are sequentially read. In this manner, the reset level and the signal level of each of the four pixels in the pixel block 300 are sequentially read.

Figure 22:
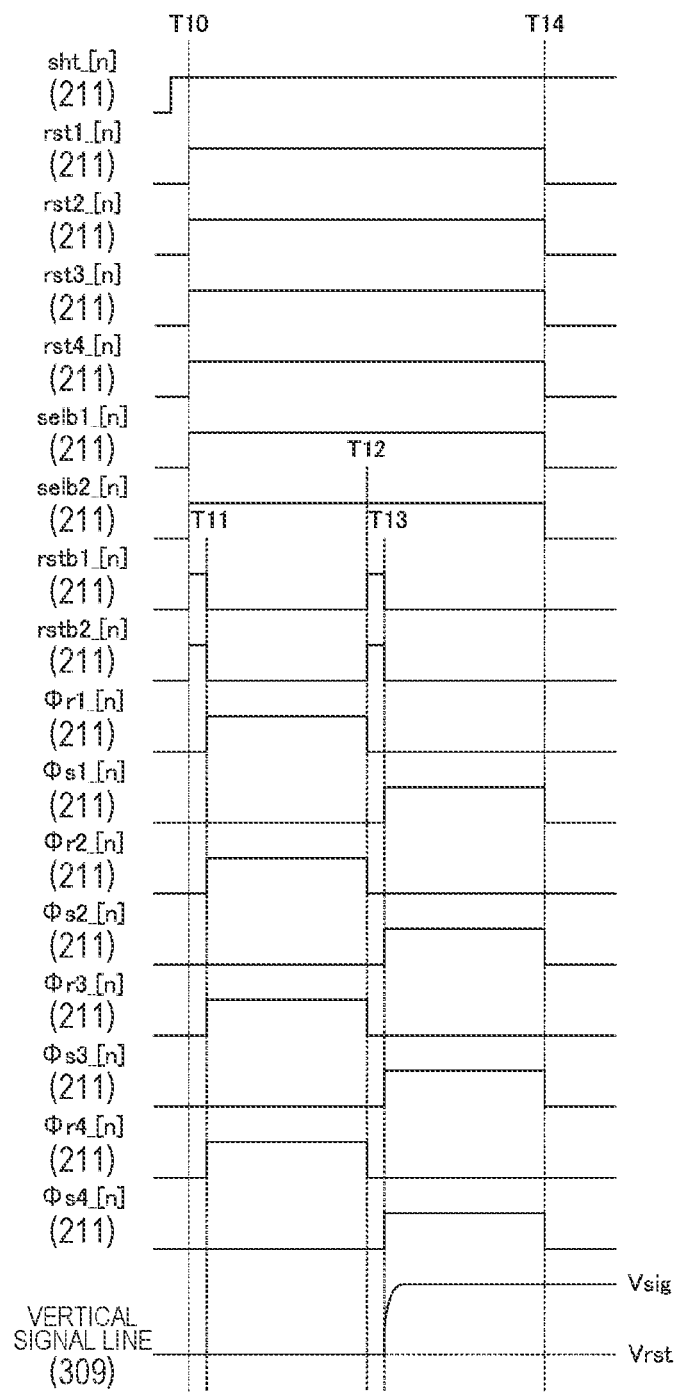
FIG. 22 is a timing chart depicting an example of a reading operation in an addition mode in the second embodiment of the present technology.

FIG. 22 is a timing chart depicting an example of a reading operation in the addition mode in the second embodiment of the present technology. In the addition mode, the vertical scanning circuit 211 sets the short-circuit signal sht to the high level. In a period from a timing T10 to a timing T14 in which the n-th row of the pixel block 300 is read, the vertical scanning circuit 211 sets the FD reset signals rst1 to rst4 and the downstream selection signals selb1 and selb2 to the high level.

Furthermore, the vertical scanning circuit 211 supplies the high-level downstream reset signals rstb1 and rstb2 in a pulse period from the timing T10 to the timing T11, and supplies the high-level selection signals Φr1 to Φr4 in a period from the timing T11 to the timing T12. During this period, a reset level Vrst is read via the vertical signal line 309. The reset level Vrst is a value obtained by adding reset levels of the four pixels in the pixel block 300.

Subsequently, the vertical scanning circuit 211 supplies the high-level downstream reset signals rstb1 and rstb2 in a pulse period from the timing T12 to the timing T13, and supplies the high-level selection signals Φs1 to Φs4 in a period from the timing T13 to the timing T14. In this period, a signal level Vsig is read via the vertical signal line 309. The signal level Vsig is a value obtained by adding signal levels of the four pixels in the pixel block 300.

Here, four pixels can be added by increasing the number of pixels sharing the downstream circuit 370 to four in the pixel block 300 of the first embodiment. However, the increase in the number of pixels sharing the downstream circuit 370 causes an adverse effect. When the number of pixels sharing the downstream circuit 370 is four, a wiring of the downstream node 360 extends across the four pixels, and a parasitic capacitance of the downstream node 360 increases. Due to the increase in the parasitic capacitance, a signal gain in a case where the pixel addition is not performed decreases. This is because voltages held in the capacitive elements 331 and 332 are reduced by the parasitic capacitance when the connection to the downstream node 360 is made. This decrease in the gain causes a decrease in a signal-noise (SN) ratio.

On the other hand, in the second embodiment in which the short-circuit transistor 480 is provided, the number of pixels sharing each of the downstream circuits 370 and 470 can be set to two pixels by bringing the short-circuit transistor 480 into the open state in the non-addition mode. Therefore, it is possible to suppress the increase in the parasitic capacitance of the downstream node as compared with the case where the four pixels share the downstream circuit 370. With such a configuration, it is possible to suppress the decrease in the SN ratio in the non-addition mode while achieving pixel addition of more than two pixels.

Incidentally, the single vertical signal line 309 is shared by the downstream circuits 370 and 470 in the pixel block 300 illustrated in FIG. 18, but the present invention is not limited to this configuration. It is also possible to wire vertical signal lines 309-1 and 309-2, connect the downstream circuit 370 to the vertical signal line 309-1, and connect the downstream circuit 470 to the vertical signal line 309-2. In this case, it is necessary to double the number of the load MOS transistors 251 and the number of the ADCs 261 in the downstream stage in accordance with the number of wrings of the vertical signal lines. Instead, one of two pixels sharing the downstream circuit 370 and one of two pixels sharing the downstream circuit 470 can be simultaneously read in the non-addition mode, and thus, the reading speed can be improved. Furthermore, in the addition mode, only one of the vertical signal lines 309-1 and 309-2 is used, and the load MOS transistor 251 corresponding to the other is controlled to an off state.

Incidentally, the first to third modifications of the first embodiment can also be applied to the second embodiment.

In this manner, since the short-circuit transistor 480 short-circuits the downstream node 360 and the downstream node 460 according to the second embodiment of the present technology, the pixel block 300 can add the respective pixel signals of the four pixels. Therefore, the sensitivity and the reading speed can be improved and the power consumption can be reduced as compared with the case where the addition is not performed.

3. Third Embodiment

Although the current source transistors (316 and 326) are arranged for each pixel in the first embodiment described above, there is a possibility that miniaturization of a pixel becomes difficult in this configuration. The solid-state imaging element 200 of a third embodiment is different from that of the first embodiment in that a current source transistor is shared by a plurality, of pixels.

Figure 23:
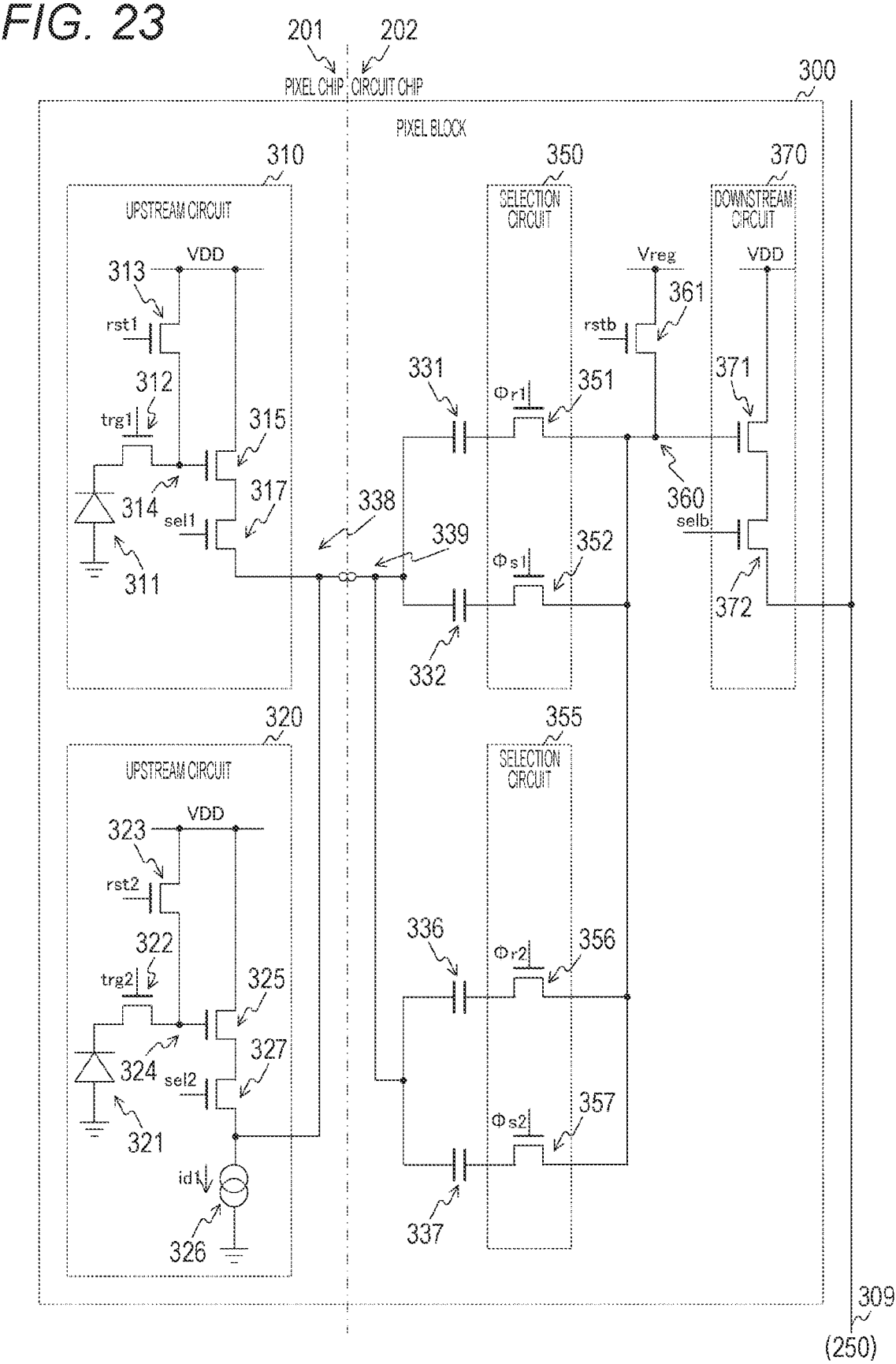
FIG. 23 is a circuit diagram depicting a configuration example of a pixel block in a third embodiment of the present technology.

FIG. 23 is a circuit diagram depicting a configuration example of the pixel block 300 in the third embodiment of the present technology. The pixel block 300 of the third embodiment is different from that of the first embodiment in that upstream selection transistors 317 and 327 are further provided, and the current source transistor 316 is not provided.

The upstream selection transistor 317 outputs a voltage amplified by the upstream amplification transistor 315 to an upstream node 338 in accordance with an upstream selection signal sel1 from the vertical scanning circuit 211. The upstream selection transistor 327 outputs a voltage amplified by the upstream amplification transistor 325 to the upstream node 338 in accordance with an upstream selection signal sel2 from the vertical scanning circuit 211. Furthermore, the current source transistor 326 is connected to the upstream node 338.

Furthermore, the capacitive elements 331, 332, 336, and 337 have one ends connected in common to an upstream node 339 and the other ends connected to the selection circuits 350 and 355. The upstream node 339 is connected to the upstream node 338.

Furthermore, circuits elements in the solid-state imaging element 200 are dispersedly arranged on the upper pixel chip 201 and the lower pixel chip 202. For example, the upstream circuits 310 and 320 are arranged on the upper pixel chip 201, and the circuits at the downstream stage thereof are arranged on the circuit chip 202. Then, the upstream node 338 and the upstream node 339 are connected by a Cu—Cu connection or the like.

In the first embodiment in which the current source transistor is arranged for each pixel, it is necessary to make the Cu—Cu connection for each pixel as illustrated in FIG. 15 when a stacked structure is formed. In particular, in a case where the capacitive element 331 having the MIM structure or the like is arranged on the circuit chip 202, a thickness of the chip increases, and it becomes difficult to flatten the surface connecting the upper and lower chips, so that a pitch of the Cu—Cu connection is restricted. For example, the pitch of the Cu—Cu connection is several micrometers (μm) while a size of a fine pixel of an image sensor for mobile use is micrometers (μm) or less. Therefore, the miniaturization becomes difficult the configuration in which the current source transistor is arranged for each pixel.

On the other hand, in the configuration in the drawing in which the current source transistor 326 is shared by the two pixels, the number of Cu—Cu connections can be reduced. Therefore, the miniaturization of the pixel is facilitated. Furthermore, a current during the global shutter operation can be reduced. Furthermore, the current source transistor 326 generally adopts a cascade configuration in order to suppress a current variation due to a channel length modulation effect of the transistor. Since the current source transistor 326 having a relatively large size is shared, the area of the transistor can be reduced.

Incidentally, the current source transistor 326 is shared by the two pixels, but the number of pixels to be shared is not limited to the two pixels and may be three or more pixels.

Figure 24:
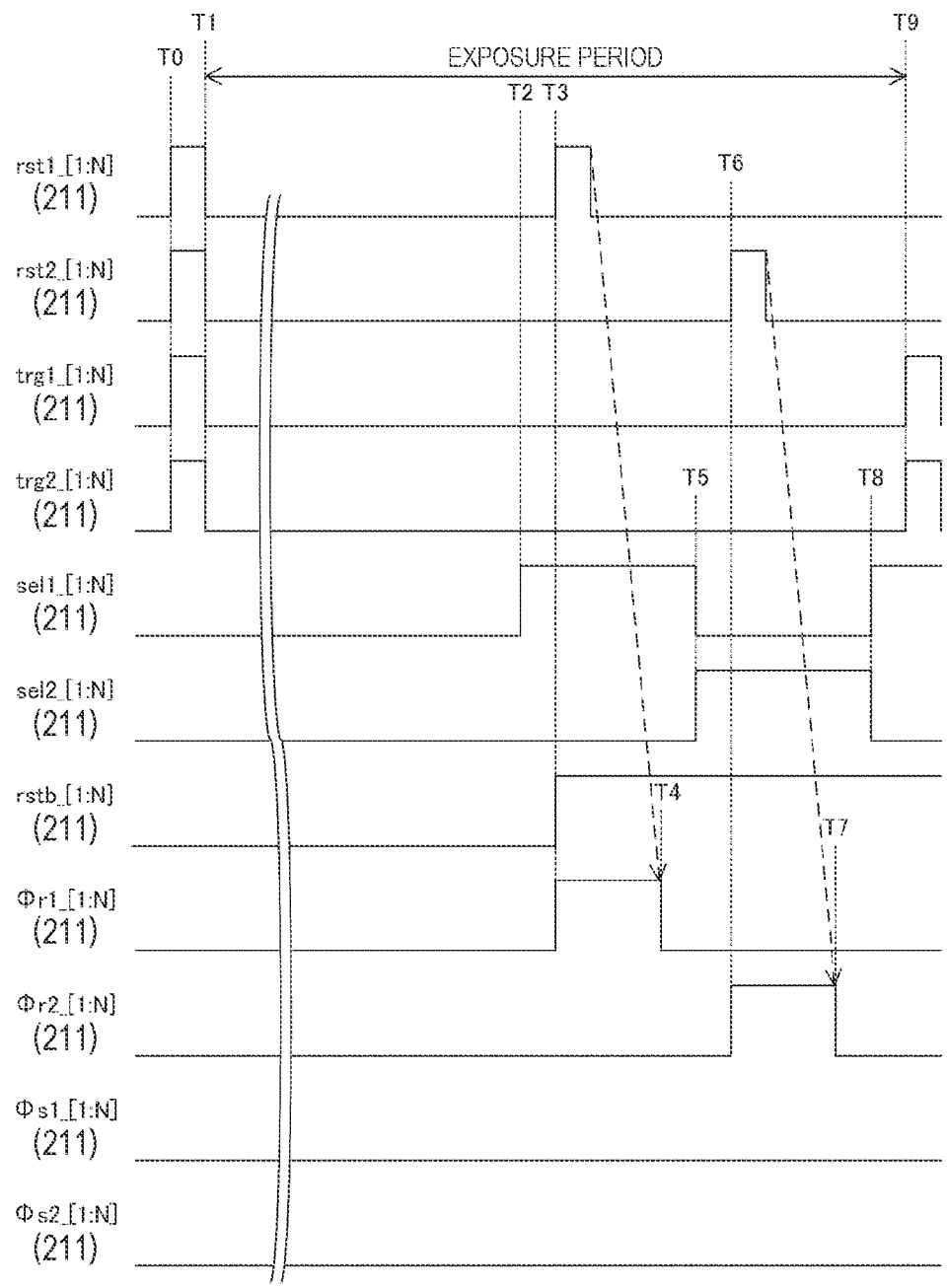
FIG. 24 is a timing chart depicting an example of a global shutter operation in the third embodiment of the present technology.

FIG. 24 is a timing chart depicting an example of the global shutter operation in the third embodiment of the present technology. The vertical scanning circuit 211 supplies the high-level FD reset signals rst1 and rst2 and transfer signals trg1 and trg2 to all rows from a timing T0 immediately before the exposure start to a timing T1 after a lapse of a pulse period. Therefore, all the pixels are subjected to the PD reset, and the exposure is simultaneously started in all the rows.

The vertical scanning circuit 211 sets the upstream selection signals sel1 of all the rows to the high level in a period from the timing T2 immediately before the exposure end to a timing T5. At a timing T3 in the period, the vertical scanning circuit 211 supplies the high-level FD reset signal rst1 over a pulse period while setting the downstream reset signal rstb and the selection signal Φr1 to the high level in all the rows. Therefore, the first pixel in the pixel block 300 is subjected to FD reset, and the reset level is sampled and held.

At a timing T4, the vertical scanning circuit 211 returns the selection signal Φr1 to the low level. Furthermore, the vertical scanning circuit 211 sets the upstream selection signals sel1 of all the rows to the low level and sets the upstream selection signals sel2 to the high level in a period from the timing T5 to a timing T8. At the timing T6 in the period, the vertical scanning circuit 211 supplies the high-level FD reset signal rst2 over a pulse period while setting the downstream reset signal rstb and the selection signal Φr2 to the high level in all the rows. Therefore, the second pixel in the pixel block 300 is subjected to FD reset, and the reset level is sampled and held.

Then, the vertical scanning circuit 211 returns the selection signals Φr2 of all the rows to the low level at the timing T7, sets the upstream selection signal sel2 to the low level, and sets the upstream selection signal sel1 to the high level at the timing T8.

Here, sel1_[n] and sel2_[n] in the drawing indicate signals to pixels in the n-th row.

As illustrated in the drawing, the vertical scanning circuit 211 sequentially sets the upstream selection transistors 317 and 327 to a closed state immediately before the exposure ends. Then, the FD reset transistor 313 performs the FD reset when the upstream selection transistor 317 is in the closed state, and the FD reset transistor 323 performs the FD reset when the upstream selection transistor 327 is in the closed state.

Figure 25:
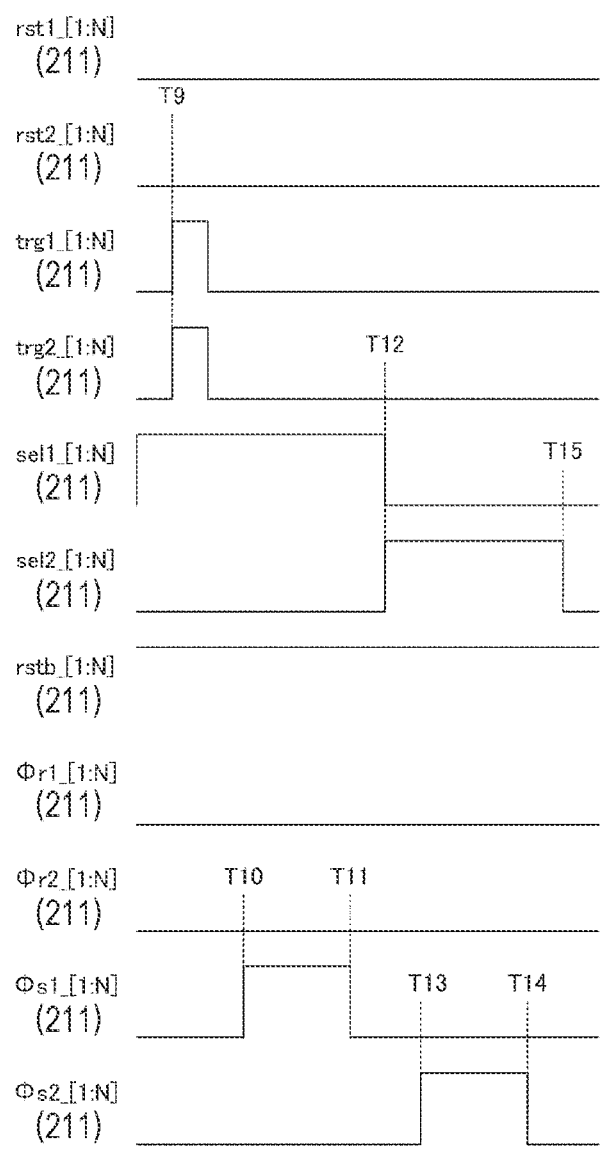
FIG. 25 is a timing chart depicting an example of control immediately after exposure ends in the third embodiment of the present technology.

FIG. 25 is a timing chart depicting an example of control immediately after the exposure ends in the third embodiment or the present technology. At an exposure end timing T9, the vertical scanning circuit 211 supplies the high-level transfer signals trg1 and trg2 over a pulse period in all the rows.

Then, the vertical scanning circuit 211 sets the selection signal Φs1 to the high level in all the rows in a period from a timing T10 to a timing T11. Therefore, the signal level of the first pixel in the pixel block 300 is sampled and held.

At a timing T12, the vertical scanning circuit 211 sets the upstream selection signals sel1 of all the rows to the low level and sets the upstream selection signals sel1 to the high level.

Then, the vertical scanning circuit 211 sets the selection signal Φs2 to the high level in all the rows in a period from a timing T13 to a timing T14. Therefore, the signal level of the second pixel the pixel block 300 is sampled and held.

The vertical scanning circuit 211 returns the upstream selection signals sel2 of all the rows to the low level at a timing T15.

As illustrated in the drawing, the vertical scanning circuit 211 sequentially sets the upstream selection transistors 317 and 327 to the closed state when the exposure ends. Then, the vertical scanning circuit 211 causes the transfer transistors 312 and 322 to transfer charges when the exposure ends, and then sequentially sets the upstream selection transistors 317 and 327 to the closed state.

Incidentally, the first and third modifications of the first embodiment and the second embodiment can be applied to the third embodiment.

In this manner, since the current source transistor 326 is shared by the two pixels according to the third embodiment of the present technology, the number of Cu—Cu connections between the chips can be reduced. Therefore, the miniaturization of the pixel is facilitated.

4. Fourth Embodiment

Although a pair of capacitors is arranged for each pixel in the first embodiment described above, but miniaturization of a pixel is difficult in this configuration. The solid-state imaging element 200 of a fourth embodiment is different from that of the first embodiment in that the number of capacitors is reduced.

Figure 26:
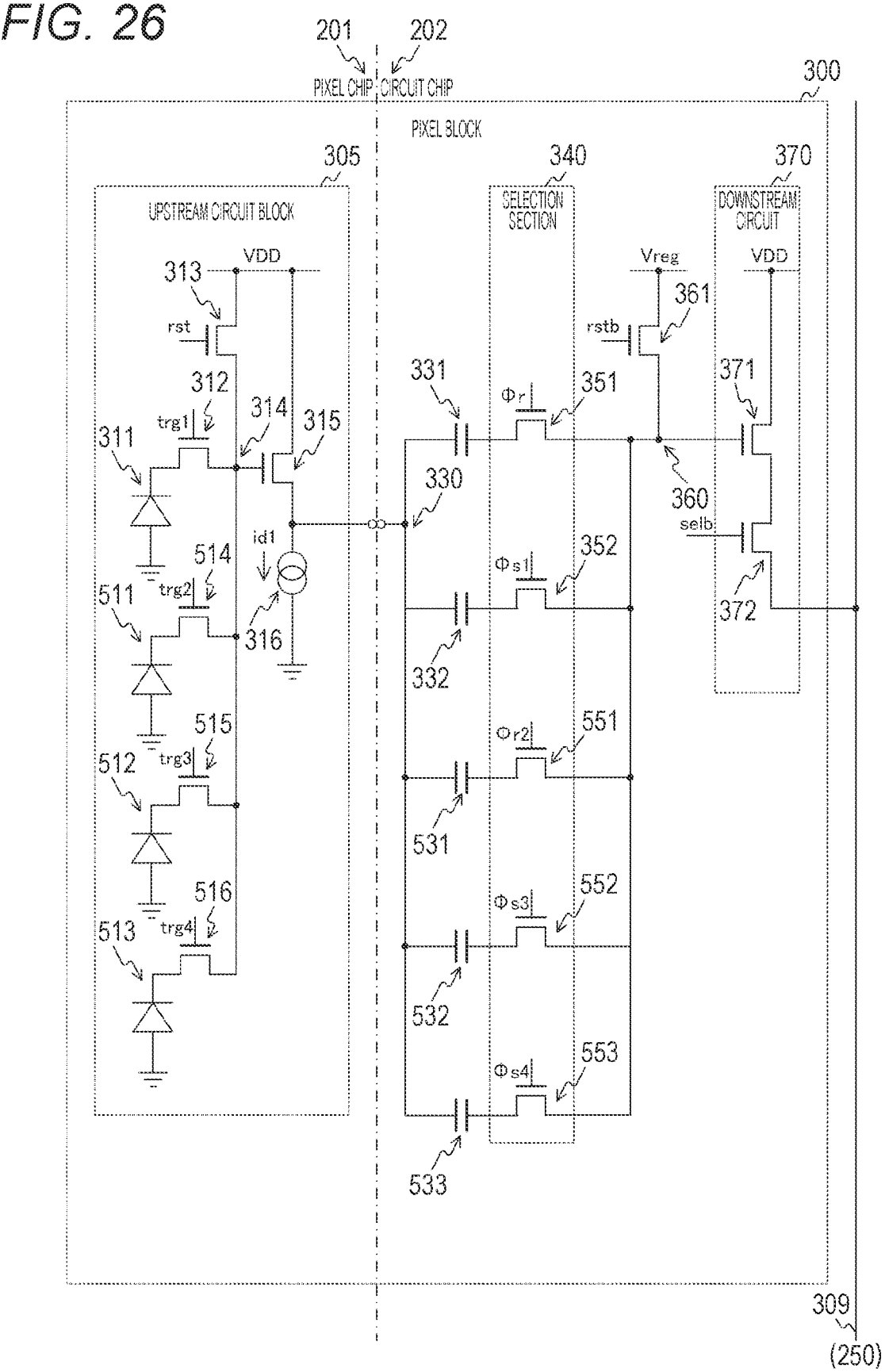
FIG. 26 is a circuit diagram depicting a configuration example of a pixel block in a fourth embodiment of the present technology.

FIG. 26 is a circuit diagram depicting a configuration example of the pixel block 300 in the fourth embodiment of the present technology. In the pixel block 300 of the fourth embodiment, the upstream circuit block 305, the capacitive elements 331 and 332, capacitive elements 531, 532, and 533, the selection section 340, the downstream reset transistor 361, and the downstream circuit 370 are arranged. In the pixel block 300 of the fourth embodiment, four pixels are arranged. For example, the pixels 301 to 304 in FIG. 17 are arranged in the pixel block 300.

The upstream circuit block 305 includes the photoelectric conversion element 311, photoelectric conversion element 511, 512, and 513, the transfer transistor 312, and transfer transistors 514, 515, and 516. Furthermore, the upstream circuit block 305 includes the FD reset transistor 313, the FD 314, the upstream amplification transistor 315, and the current source transistor 316. As the transfer transistors 312, 514, 515, and 516, for example, nMOS transistors are used.

Furthermore, the selection section 340 includes the selection transistors 351 and 352, and selection transistors 551, 552, and 5553. As the selection transistors 551, 552, and 553, for example, nMOS transistors are used.

Connection configurations of the photoelectric conversion element 311, the transfer transistor 312, the FD reset transistor 313, the FD 314, the upstream amplification transistor 315, and the current source transistor 316 of the fourth embodiment are similar to those of the first embodiment. However, a FD reset signal rst from the vertical scanning circuit 211 is input to the FD reset transistor 313.

The photoelectric conversion elements 511 to 513 generate charges by photoelectric conversion. The transfer transistor 514 transfers the charge from the photoelectric conversion element 511 to the FD 314 in accordance with a transfer signal trg2 from the vertical scanning circuit 211. The transfer transistor 515 transfers the charge from the photoelectric conversion element 512 to the FD 314 in accordance with a transfer signal trg3 from the vertical scanning circuit 211. The transfer transistor 516 transfers the charge from the photoelectric conversion element 513 to the FD 314 in accordance with a transfer signal trg4 from the vertical scanning circuit 211.

Connection configurations among the capacitive elements 331 and 332 and the selection transistors 351 and 352 of the fourth embodiment are similar to those of the first embodiment. However, a select ion signal Φr from the vertical scanning circuit 211 is input to the selection transistor 351.

The capacitive elements 531, 532, and 533 have one ends connected in common to the upstream node 330 and the other ends connected to the selection section 340.

The selection transistor 551 opens and closes a path between the capacitive element 531 and the downstream node 360 in accordance with a selection signal Φr2 from the vertical scanning circuit 211. The selection transistor 552 opens and closes a path between the capacitive element 532 and the downstream node 360 in accordance with a selection signal Φr3 from the vertical scanning circuit 211. The selection transistor 553 opens and closes a path between the capacitive element 533 and the downstream node 360 in accordance with a selection signal Φr4 from the vertical scanning circuit 211.

Circuit configurations of the downstream reset transistor 361 and the downstream circuit 370 of the fourth embodiment are similar to those of the first embodiment.

Furthermore, circuits and elements in the solid-state imaging element 200 are dispersedly arranged on the upper pixel chip 201 and the circuit chip 202. For example, the upstream circuit block 305 is arranged on the upper pixel chip 201, and the circuits at the downstream stage thereof are arranged on the circuit chip 202.

As illustrated in FIG. 26, one FD 314, the downstream reset transistor 361, and the downstream circuit 370 are shared by the four pixels. Furthermore, reset levels of the four pixels are held in the capacitive element 331, and signal levels of the four pixels are held in the capacitive elements 332, 531, 532, and 533, respectively. Although it is necessary to arrange the capacitors configured to hold the reset levels for each pixel in the first embodiment, the number of capacitors can be reduced since the capacitor is shared by the four pixels in the fourth embodiment. Therefore, the miniaturization of the pixel is facilitated as compared with a case where the capacitor is not shared.

Incidentally, the FD 314 and the like are shared by the four pixels, but the number of sharing pixels is not limited to the four pixels. Furthermore, the capacitive elements 331 and 332 are examples of the first and second capacitive elements described in the claims. The capacitive elements 531, 532, and 533 are examples of the third capacitive element described in the claims.

Figure 27:
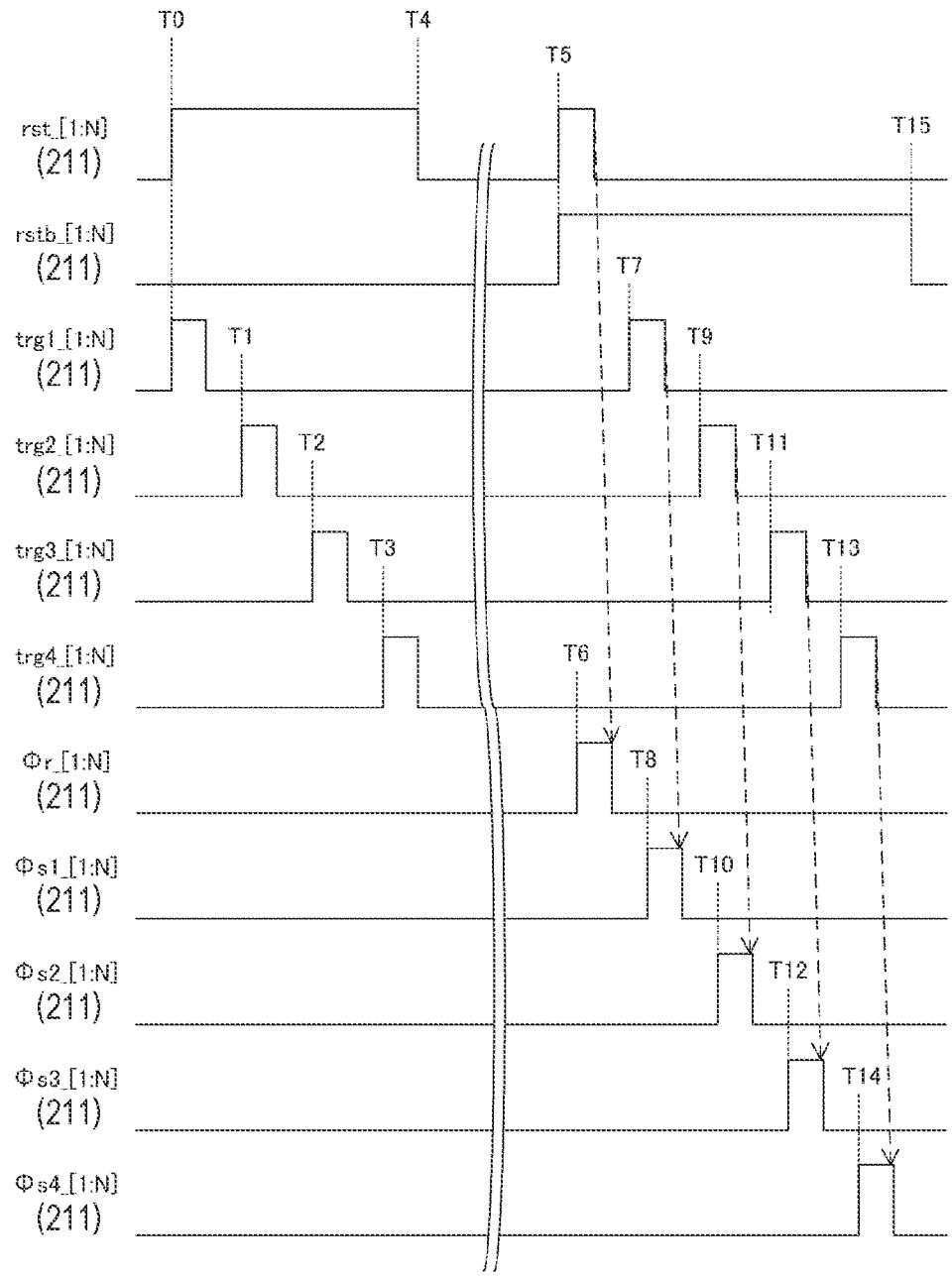
FIG. 27 is a timing chart depicting an example of a global shutter operation in the fourth embodiment of the present technology.

FIG. 27 is a timing chart depicting an example of a global shutter operation in the fourth embodiment of the present technology. The vertical scanning circuit 211 supplies the high-level FD reset signal rst to all rows in a period from a timing T0 when exposure starts to a timing T4. At the timings T0, T1, T2, and T3 within this period, the vertical scanning circuit 211 supplies transfer signals trg1, trg2, trg3, and trg4 to all the rows over a pulse period. Therefore, ail the pixels are subjected to PD reset.

Then, the vertical scanning circuit 211 supplies a high-level downstream reset signal rstb to all the rows in a period from a timing T5 when the exposure ends to a timing T15. Furthermore, the vertical scanning circuit 211 supplies the FD reset signal rst to all the rows over a pulse period at the timing T5. At the timing T6 immediately after the timing T5, the vertical scanning circuit 211 supplies the selection signal Φr to all the rows over a pulse period. Therefore, all the rows are subjected to FD reset.

Furthermore, the vertical scanning circuit 211 supplies the transfer signal trg1 to all the rows over a pulse period at the timing T7. At the timing T8 immediately after the timing T7, the vertical scanning circuit 211 supplies a selection signal Φs1 to all the rows over a pulse period. Therefore, the signal level of the first pixel in the pixel block 300 is sampled and held.

Furthermore, the vertical scanning circuit 211 supplies the transfer signal trg2 to all the rows over a pulse period at the timing T9. At the timing T10 immediately after the timing T9, the vertical scanning circuit 211 supplies a selection signal Φs2 to all the rows over a pulse period. Therefore, the sum of the signal levels of the first and second pixels in the pixel block 300 is sampled and held.

Furthermore, the vertical scanning circuit 211 supplies the transfer signal trg3 to all the rows over a pulse period at the timing T11. At the timing T12 immediately after the timing T11, the vertical scanning circuit 211 supplies a selection signal Φs3 to all the rows over a pulse period. Therefore, the sum of the signal levels of the first to third pixels in the pixel block 300 is sampled and held.

Furthermore, the vertical scanning circuit 211 supplies the transfer signal trg4 to all the rows over a pulse period at the timing T13. At the timing T14 immediately after the timing T13, the vertical scanning circuit 211 supplies a selection signal Ts4 to all the rows over a pulse period. Therefore, the sum of the signal levels of the first to fourth pixels in the pixel block 300 is sampled and held.

Here, rst_[n] and Φr_[n] indicate signals with respect to pixels in the n-th row among N rows.

Since the FD 314 is shared by the four pixels in the fourth embodiment, it is not possible to perform charge transfer of each of the four pixels at the same time as illustrated in the drawing. However, four capacitors (the capacitive elements 332, 531, 532 and 533) as charge transfer destinations can be sampled in the order or several microseconds (μs), a difference in exposure time between the pixels does not become too large.

Figure 28:
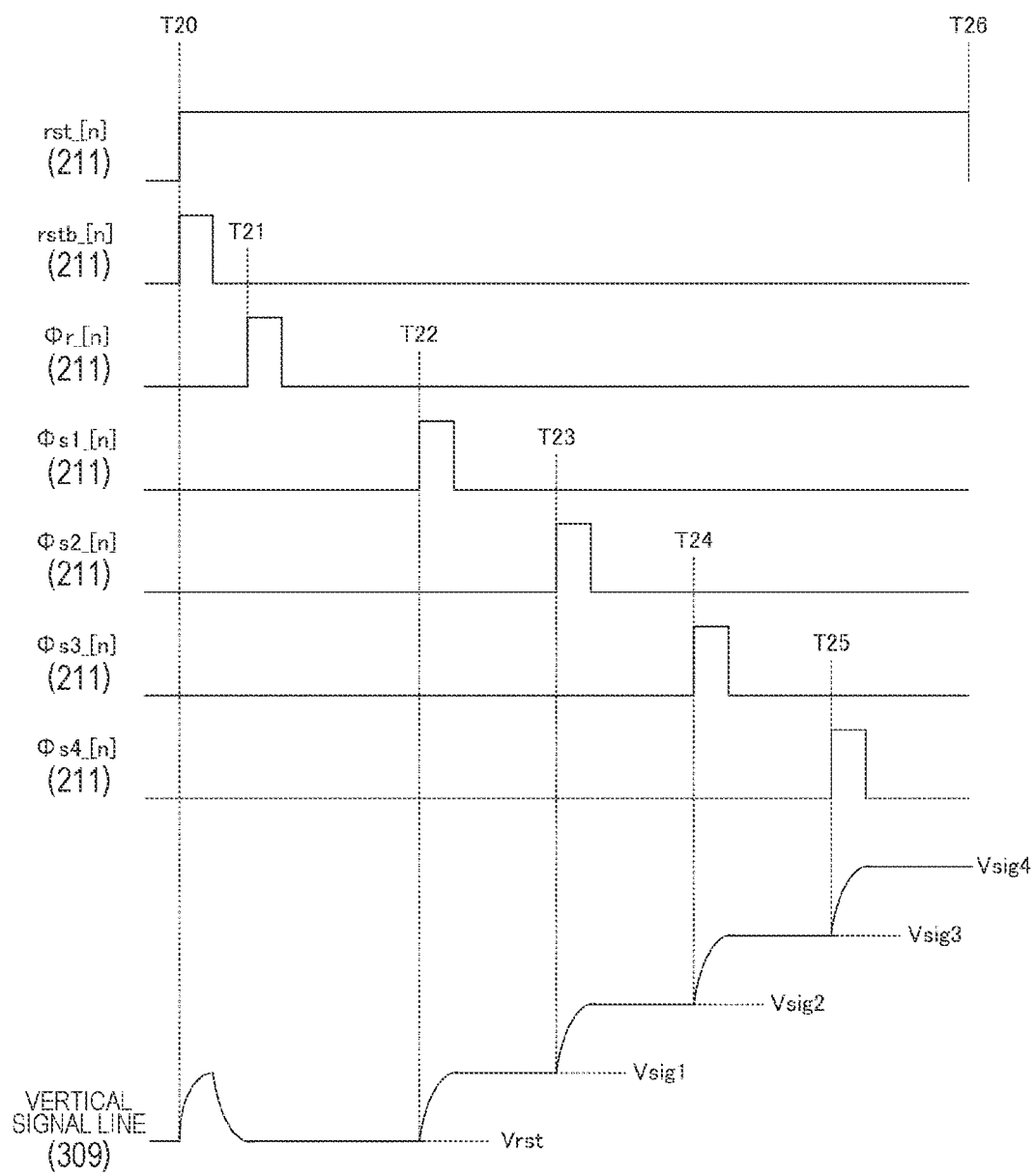
FIG. 28 is a timing chart depicting an example of an operation of reading a reset level and a signal level in the fourth embodiment of the present technology.

FIG. 28 is a timing chart depicting an example of an operation of reading the reset level and the signal level in the fourth embodiment of the present technology.

During a period from a timing T20 to a timing T26 when the n-th row is read, the vertical scanning circuit 211 sets the FD reset signal rst to the high level.

Furthermore, at the timing T20, the vertical scanning circuit 211 supplies the high-level downstream reset signal rstb to the n-th row over a pulse period. Then, the vertical scanning circuit 211 supplies a high-level selection signal Φr to the n-th row over a pulse period at the timing T21 immediately after the timing T20. Immediately after this control, the reset level used in common in the four pixels is read via the vertical signal line 309.

Then, the vertical scanning circuit 211 supplies the high-level selection signal Φs1 to the n-th row over a pulse period at the timing T22 after the reset level is read. Immediately after this control, a signal level Vsig1 of the first pixel is read via the vertical signal line 309. The column signal processing circuit 260 obtains a difference between a reset level Vrst and the signal level Vsig1 as a net signal level of the first pixel by CDS processing.

Then, the vertical scanning circuit 211 supplies the high-level selection signal Φs2 to the n-th row over a pulse period at the timing T23 after the signal level Vsig1 is read. Immediately after this control, Vsig2 is read via the vertical signal line 309. This Vsig2 corresponds to the sum of the signal levels of the first and second pixels. The column signal processing circuit 260 obtains a difference between Vsig1 and Vsig2 as the signal level after the CDS processing of the second pixel.

Then, the vertical scanning circuit 211 supplies the high-level selection signal Φs3 to the n-th row over a pulse period at the timing T24 after Vsig2 is read. Immediately after this control, Vsig3 is read via the vertical signal line 309. This Vsig3 corresponds to the sum of the signal levels of the first to third pixels. The column signal processing circuit 260 obtains a difference between Vsig2 and Vsig3 as the signal level after the CDS processing of the third pixel.

Then, the vertical scanning circuit 211 supplies the high-level selection signal Φs4 to the n-th row over a pulse period at the timing T25 after Vsig3 is read. Immediately after this control, Vsig4 is read via the vertical signal line 309. This Vsig4 corresponds to the sum of the signal levels of the first to fourth pixels. The column signal processing circuit 260 obtains a difference between Vsig3 and Vsig4 as the signal level after the CDS processing of the fourth pixel.

Incidentally, the third modification of the first embodiment can also be applied to the fourth embodiment.

In this manner, since the capacitive element 331 holding the reset level is shared by the four pixels in the fourth embodiment of the present technology, the miniaturization of the pixel is facilitated as compared with a case where the capacitive element is not shared.

5. Example of Application to Mobile Body

The technology according to the present disclosure (present technology) can be applied to various products. For example, the technology according to the present disclosure may be achieved as a device mounted on any type of mobile body such as an automobile, an electric vehicle, a hybrid electric vehicle, a motorcycle, a bicycle, a personal mobility, an airplane, a drone, a ship, and a robot.

Figure 29:
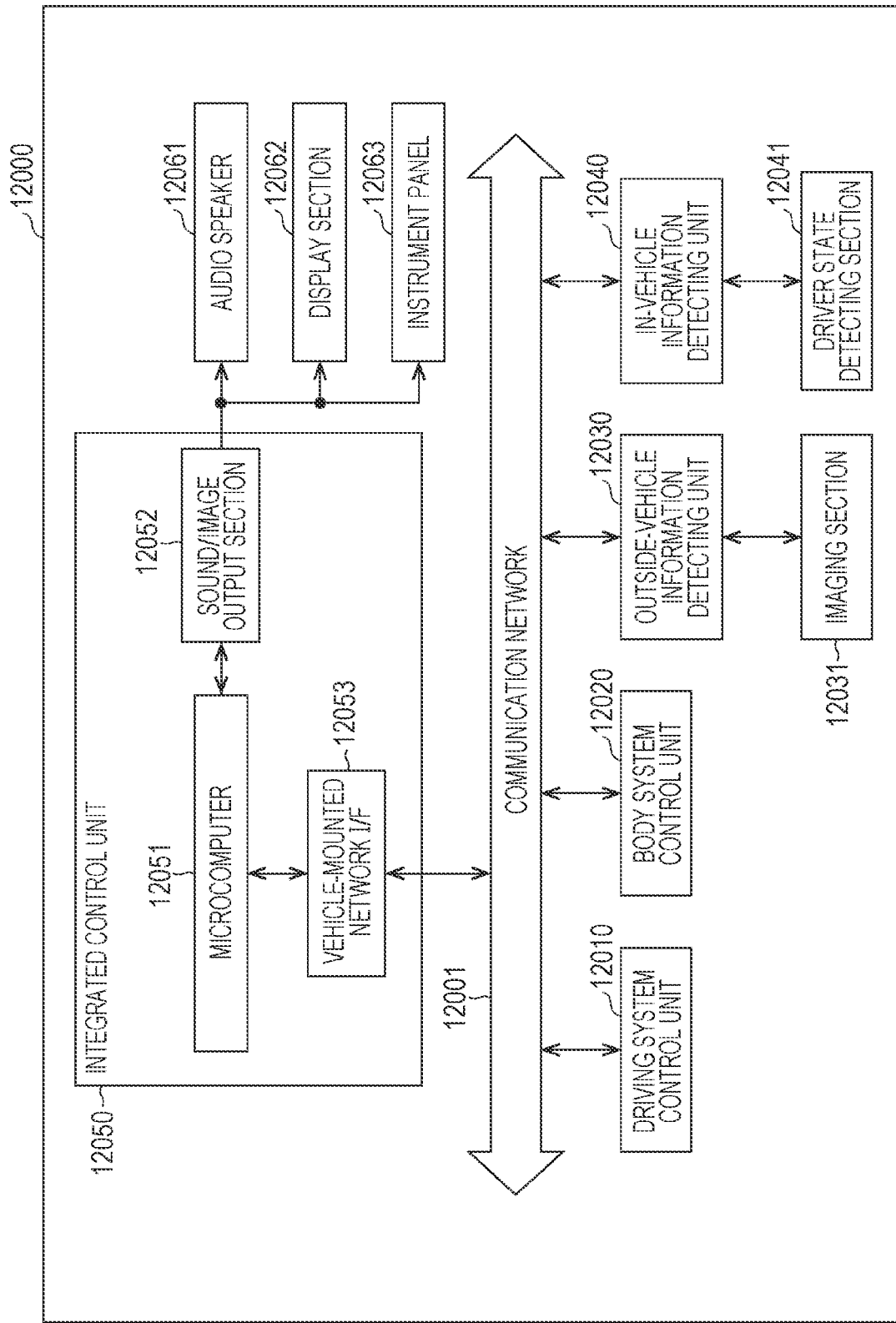
FIG. 29 is a block diagram depicting a schematic configuration example of a vehicle control system.

FIG. 29 is a block diagram depicting a schematic configuration example of a vehicle control system as an example of a mobile body control system to which the technology according to the present disclosure can be applied.

The vehicle control system 12000 includes a plurality of electronic control units connected to each other via a communication network 12001. In the example depicted in FIG. 29, the vehicle control system 12000 includes a driving system control unit 12010, a body system control unit 12020, an outside-vehicle information detecting unit 12030, an in-vehicle information detecting unit 12040, and an integrated control unit 12050. Furthermore, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lambs, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle, information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

Furthermore, the microcomputer 12051 can output a control command to the body system control unit 12020 on the basis of the information regarding the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 29, an audio speaker 12061, a display section 12062, and an instrument panel 12063 are illustrated as the output device. The display section 12062 may, for example, include at least one of an on-board display and a head-up display.

Figure 30:
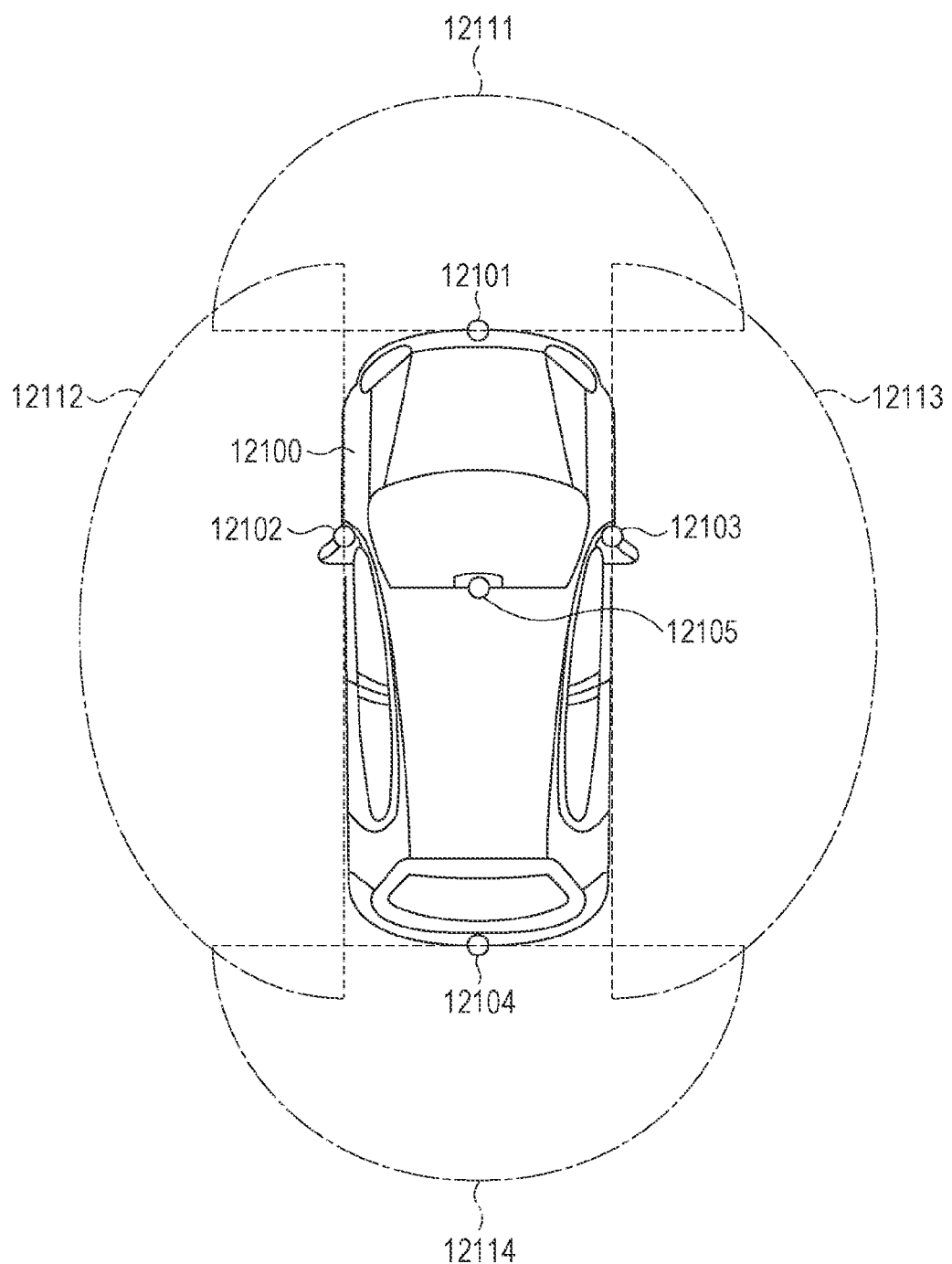
FIG. 30 is an explanatory diagram depicting an example of an installation position of an imaging section.

FIG. 30 is a diagram depicting an example of the installation position of the imaging section 12031.

In FIG. 30, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 30 depicts an example of imaging ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described as above. The technology according to the present disclosure can be applied to the imaging section 12031 among the above-described configurations. Specifically, for example, the imaging device 100 in FIG. 1 can be applied to the imaging section 12031. When the technology according to the present disclosure is applied to the imaging section 12031, kTC noise can be reduced, and a more easily viewable imaged image can be obtained, so that the fatigue of the driver can be reduced.

Incidentally, the above-described embodiments illustrate examples for embodying the present technology, and the matters in the embodiments respectively have correspondence relationships with the matters specifying the invention in the claims. Similarly, the matters specifying the invention in the claims respectively have correspondence relationships with the matters in the embodiments of the present technology having the same names. However, the present technology is not limited to the embodiments, and can be embodied by making various modifications to the embodiments within the scope not departing from the gist thereof.

Incidentally, the effects described in the present specification are merely examples and are not limited, and there may be additional effects.

Incidentally, the present technology can also have the following configurations.

(1) A solid-state imaging element including:
a predetermined number of capacitive elements;
an upstream circuit block that generates each of a predetermined reset level and a plurality of signal levels each corresponding to an exposure amount and causes the capacitive elements, different from each other, to hold the reset level and the plurality of signal levels;
a selection section that sequentially performs control to connect the capacitive element in which the reset level is held among the predetermined number of capacitive elements to a predetermined downstream node, control to disconnect the predetermined number of capacitive elements from the downstream node, and control to connect the capacitive element in which any of the plurality of signal levels is held among the predetermined number of capacitive elements to the downstream node;
a downstream reset transistor that initializes a level of the downstream node when the predetermined number of capacitive elements are disconnected from the downstream node; and
a downstream circuit that sequentially reads each of the reset level and the plurality of signal levels via the downstream node.

(2) The solid-state imaging element according to the above-described (1), in which
the predetermined number of capacitive elements include first and second capacitive elements and third and fourth capacitive elements,
the upstream circuit block includes:
a first upstream circuit that sequentially generates a first reset level and a first signal level and causes the first and second capacitive elements to hold the first reset level and the first signal level; and
a second upstream circuit that sequentially generates a second reset level and a second signal level and causes the third and fourth capacitive elements to hold the second reset level and the second signal level, and
the selection section includes:
a first selection circuit that connects any of the first and second capacitive elements to the downstream node; and
a second selection circuit that connects any of the third and fourth capacitive elements to the downstream node.

(3) The solid-state imaging element according to the above-described (2), in which
the first upstream circuit includes:
a first photoelectric conversion element;
a first upstream transfer transistor that transfers a charge from the first photoelectric conversion element to a first floating diffusion layer;
a first reset transistor that initializes the first floating diffusion layer; and
a first upstream amplification transistor that amplifies a voltage of the first floating diffusion layer, and
the second upstream circuit includes:
a second photoelectric conversion element;
a second upstream transfer transistor that transfers a charge from the second photoelectric conversion element to a second floating diffusion layer;
a second reset transistor that initializes the second floating diffusion layer; and
a second upstream amplification transistor that amplifies a voltage of the second floating diffusion layer.

(4) The solid-state imaging element according to the above-described (3), in which
the first upstream circuit further includes a first current source transistor connected to a first upstream node,
the second upstream circuit further includes a second current source transistor connected to a second upstream node,
the first upstream amplification transistor amplifies the voltage of the first floating diffusion layer and outputs the amplified voltage to the first upstream node,
the second upstream amplification transistor amplifies the voltage of the second floating diffusion layer and outputs the amplified voltage to the second upstream node,
the first and second capacitive elements respectively have first ends connected in common to the first upstream node and second ends connected to the first selection circuit, and
the third and fourth capacitive elements respectively have first ends connected in common to the second upstream node and second ends connected to the second selection circuit.

(5) The solid-state imaging element according to the above-described (3) or (4), in which
the first and second upstream transfer transistors transfer the charges to the first and second floating diffusion layers and the first and second reset transistors initialize the first and second photoelectric conversion elements together with the first and second floating diffusion layers at a predetermined exposure start timing, and
the first and second upstream transfer transistors transfer the charges to the first and second floating diffusion layers at a predetermined exposure end timing.

(6) The solid-state imaging element according to any one of the above-described (3) to (5), in which
the selection section sequentially performs control to connect one of the first and second capacitive elements to the downstream node, control to connect another of the first and second capacitive elements to the downstream node, control to connect one of the third and fourth capacitive elements to the downstream node, and control to connect another of the third and fourth capacitive elements to the downstream node.

(7) The solid-state imaging element according to any one of the above-described (3) to (6), in which the selection section sequentially performs control to connect both one of the first and second capacitive elements and one of the third and fourth capacitive elements to the downstream node and control to connect both another of the first and second capacitive elements and another of the third and fourth capacitive elements to the downstream node in a predetermined addition mode.

(8) The solid-state imaging element according to the above-described (3), in which
the first upstream circuit further includes a first upstream selection transistor that outputs the voltage amplified by the first upstream amplification transistor to a predetermined upstream node in accordance with a predetermined first selection signal,
the second upstream circuit includes:
a second upstream selection transistor that outputs the voltage amplified by the second upstream amplification transistor to the upstream node in accordance with a predetermined second selection signal; and
a current source transistor connected to the upstream node,
the first and second capacitive elements respectively have first ends connected in common to the upstream node and second ends connected to the first selection circuit, and
the third and fourth capacitive elements respectively have first ends connected in common to the upstream node and second ends connected to the second selection circuit.

(9) The solid-state imaging element according to the above-described (8), in which
the first and second upstream selection transistors sequentially transition to a closed state immediately before a predetermined exposure end timing and after the exposure end timing,
the first reset transistor initializes the first floating diffusion layer when the first upstream selection transistor is in the closed state,
the second reset transistor initializes the second floating diffusion layer when the second upstream selection transistor is in the closed state,
the first and second upstream selection transistors sequentially transition to the closed state immediately after the exposure end timing, and
the first and second upstream transfer transistors transfer the charges at a predetermined exposure end timing.

(10) The solid-state imaging element according to the above-described (1), further including
a short-circuit transistor that opens and closes a path between a first downstream node and a second downstream node,
in which the predetermined number of capacitors include first, second, third, fourth, fifth, sixth, seventh, and eighth capacitive elements, and
the selection section includes:
a first selection circuit that connects any of the first and second capacitive elements to the first downstream node;
a second selection circuit that connects any of the third and fourth capacitive elements to the first downstream node;
a third selection circuit that connects any of the fifth and sixth capacitive elements to the second downstream node; and
a fourth selection circuit that connects any of the seventh and eighth capacitive elements to the second downstream node.

(11) The solid-state imaging element according to the above-described (10), in which
the short-circuit transistor is in an open state in a predetermined non-addition mode, and
in the non-addition mode, the selection section performs control to sequentially connect each of the first and second capacitive elements to the first downstream node, control to sequentially connect each of the third and fourth capacitive elements to the first downstream node, control to sequentially connect each of the fifth and sixth capacitive elements to the second downstream node, and control to sequentially connect each of the seventh and eighth capacitive elements to the second downstream node in a predetermined order.

(12) The solid-state imaging element according to the above-described (10) or (11), in which
the short-circuit transistor is in a closed state in a predetermined addition mode, and
in the addition mode, the selection section sequentially performs control to connect one of the fifth and sixth capacitive elements and one of the seventh and eighth capacitive elements to the second downstream node while connecting one of the first and second capacitive elements and one of the third and fourth capacitive elements to the first downstream node, and control to connect another of the fifth and sixth capacitive elements and another of the seventh and eighth capacitive elements to the second downstream node while connecting another of the first and second capacitive elements and another of the third and fourth capacitive elements to the first downstream node.

(13) The solid-state imaging element according to the above-described (1), in which
the predetermined number of capacitive elements include first and second capacitive elements and a third capacitor,
the upstream circuit block includes:
a first photoelectric conversion element;
a first upstream transfer transistor that transfers a charge from the first photoelectric conversion element to a predetermined floating diffusion layer;
a second photoelectric conversion element;
a second upstream transfer transistor that transfers a charge from the second photoelectric conversion element to a predetermined floating diffusion layer;
a reset transistor that initializes the floating diffusion layers; and
an upstream amplification transistor that amplifies voltages of the floating diffusion layers and outputs the amplified voltages to a predetermined upstream node, and
the first and second capacitive elements and the third capacitive element respectively have first ends connected in common to the upstream node and second ends connected to the selection section.

(14) The solid-state imaging element according to the above-described (13), in which.
the first and second upstream transfer transistors transfer the charges to the floating diffusion layers at a predetermined exposure start timing, and the reset transistor initializes the first and second photoelectric conversion elements together with the floating diffusion layers, and the first and second upstream transfer transistors sequentially transfer the charges to the first and second floating diffusion layers at a predetermined exposure end timing.

(15) The solid-state imaging element according to the above-described (13) or (14), in which the selection section sequentially performs control to connect one of the first and second capacitive elements to the downstream node, control to connect another of the first and second capacitive elements to the downstream node, and control to connect the third capacitive element to the downstream node.

(16) The solid-state imaging element according to any one of the above-described (1) to (15), in which
the upstream circuit block is provided on a first chip, and
the predetermined number of capacitive elements, the selection section, the downstream reset transistor, and the downstream circuit are provided on a second chip.

(17) The solid-state imaging element according to the above-described (16), further including
an analog-to-digital converter that sequentially converts the output reset level and the plurality of output signal levels into digital signals,
in which the analog-to-digital converter is provided on the second chip.

(18) The solid-state imaging element according to the above-described (16) or (17), further including
an analog-to-digital converter that sequentially converts the output reset level and the plurality of output signal levels into digital signals,
in which the analog-to-digital converter is provided on a third chip.

(19) An imaging device including:
a predetermined number of capacitive elements;
an upstream circuit block that generates each of a predetermined reset level and a plurality of signal levels each corresponding to an exposure amount and causes the capacitive elements, different from each other, to hold the reset level and the plurality of signal levels;
a selection section that sequentially performs control to connect the capacitive element in which the reset level is held among the predetermined number of capacitive elements to a predetermined downstream node, control to disconnect the predetermined number of capacitive elements from the downstream node, and control to connect the capacitive element in which any of the plurality of signal levels is held among the predetermined number of capacitive elements to the downstream node;
a downstream reset transistor that initializes a level of the downstream node when the predetermined number of capacitive elements are disconnected from the downstream node;
a downstream circuit that sequentially reads each of the reset level and the plurality of signal levels via the downstream node; and
a signal processing circuit that sequentially converts the reset level and the plurality of signal levels into digital signals and processes the digital signals.

(20) A solid-state imaging element including:
a first photoelectric conversion element that converts incident light into a charge;
a second photoelectric conversion element that converts incident light into a charge;
an upstream amplification transistor that converts the charges into voltages;
a predetermined number of capacitive elements each having first end connected to an upstream node which is an output destination of the upstream amplification transistor;
a predetermined number of selection transistors inserted in each of paths between each of second ends of the predetermined number of capacitive elements and a predetermined downstream node;
a reset transistor having a source or a drain connected to the downstream node; and
a downstream amplification transistor that has a gate connected to the downstream node and outputs a pixel signal.

REFERENCE SIGNS LIST

100 Imaging device
110 Imaging lens
120 Recording unit
130 Imaging control section
200 Solid-state imaging element
201 Upper pixel chip
202 Lower pixel chip
203 Circuit chip
211 Vertical scanning circuit
212 Timing control circuit
213 DAC
220 Pixel array section
221 Upper pixel array section
222 Lower pixel array section
250 Load MOS circuit block
251 Load MOS transistor
260 Column signal processing circuit
261 ADC
262 Digital signal processing section
300 Pixel block
301 to 304 Pixel
305 Upstream circuit block
310, 320, 410, 420 Upstream circuit
311, 321, 411, 421, 511 to 513 Photoelectric conversion element
312, 322, 412, 422, 514 to 516 Transfer transistor
313, 323, 413, 423 FD reset transistor
314, 324, 414, 424 FD
315, 325, 415, 425 Upstream amplification transistor
316, 326, 416, 426 Current source transistor
317, 327 Upstream selection transistor
331, 332, 336, 337, 431, 432, 436, 437, 531 to 533 Capacitive element
340 Selection section
350, 355, 450, 455 Selection circuit
351, 352, 356, 357, 451, 452, 456, 457, 551 to 553 Selection transistor
361, 461 Downstream reset transistor
370, 470 Downstream circuit
371, 471 Downstream amplification transistor
372, 472 Downstream selection transistor
480 Short-circuit transistor
12031 Imaging section

The invention claimed is:
1. A solid-state imaging element comprising:
a predetermined number or capacitive elements;
an upstream circuit block that generates each of a predetermined reset level and a plurality of signal levels each corresponding to an exposure amount and causes the capacitive elements, different from each other, to hold the reset level and the plurality of signal levels;

a selection section that sequentially performs control to connect the capacitive element in which the reset level is held among the predetermined number of capacitive elements to a predetermined downstream node, control to disconnect the predetermined number of capacitive elements from the downstream node, and control to connect the capacitive element in which any of the plurality of signal levels is held among the predetermined number of capacitive elements to the downstream node;

a downstream reset transistor that initializes a level of the downstream node when the predetermined number of capacitive elements are disconnected from the downstream node; and a downstream circuit that sequentially reads each of the reset level and the plurality of signal levels via the downstream node.

2. The solid-state imaging element according to claim 1, wherein the predetermined number of capacitive elements include first and second capacitive elements and third and fourth capacitive elements, the upstream circuit block includes:

a first upstream circuit that sequentially generates a first reset level and a first signal level and causes the first and second capacitive elements to hold the first reset level and the first signal level; and a second upstream circuit that sequentially generates a second reset level and a second signal level and causes the third and fourth capacitive elements to hold the second reset level and the second signal level, and the selection section includes:

a first selection circuit that connects any of the first and second capacitive elements to the downstream node; and a second selection circuit that connects any of the third and fourth capacitive elements to the downstream node.

3. The solid-state imaging element according to claim 2, wherein the first upstream circuit includes:

a first photoelectric conversion element;

a first upstream transfer transistor that transfers a charge from the first photoelectric conversion element to a first floating diffusion layer;

a first reset transistor that initializes the first floating diffusion layer; and a first upstream amplification transistor that amplifies a voltage of the first floating diffusion layer, and the second upstream circuit includes:

a second photoelectric conversion element;

a second upstream transfer transistor that transfers a charge from the second photoelectric conversion element to a second floating diffusion layer;

a second reset transistor that initializes the second floating diffusion layer; and a second upstream amplification transistor that amplifies a voltage of the second floating diffusion layer.

4. The solid-state imaging element according to claim 3, wherein the first upstream circuit further includes a first current source transistor connected to a first upstream node, the second upstream circuit further includes a second current source transistor connected to a second upstream node, the first upstream amplification transistor amplifies the voltage of the first floating diffusion layer and outputs the amplified voltage to the first upstream node, the second upstream amplification transistor amplifies the voltage of the second floating diffusion layer and outputs the amplified voltage to the second upstream node, the first and second capacitive elements respectively have first ends connected in common to the first upstream node and second ends connected to the first selection circuit, and the third and fourth capacitive elements respectively have first ends connected in common to the second upstream node and second ends connected to the second selection circuit.

5. The solid-state imaging element according to claim 3, wherein the first and second upstream transfer transistors transfer the charges to the first and second floating diffusion layers at a predetermined exposure start timing, and the first and second reset transistors initialize the first and second photoelectric conversion elements together with the first and second floating diffusion layers, and the first and second upstream transfer transistors transfer the charges to the first and second floating diffusion layers at a predetermined exposure end timing.

6. The solid-state imaging element according to claim 3, wherein the selection section sequentially performs control to connect one of the first and second capacitive elements to the downstream node, control to connect another of the first and second capacitive elements to the downstream node, control to connect one of the third and fourth capacitive elements to the downstream node, and control to connect another of the third and fourth capacitive elements to the downstream node.

7. The solid-state imaging element according to claim 3, wherein the selection section sequentially performs control to connect both one of the first and second capacitive elements and one of the third and fourth capacitive elements to the downstream node and control to connect both another of the first and second capacitive elements and another of the third and fourth capacitive elements to the downstream node in a predetermined addition mode.

8. The solid-state imaging element according to claim 3, wherein the first upstream circuit further includes a first upstream selection transistor that outputs the voltage amplified by the first upstream amplification transistor to a predetermined upstream node in accordance with a predetermined first selection signal, the second upstream circuit includes:

a second upstream selection transistor that outputs the voltage amplified by the second upstream amplification transistor to the upstream node in accordance with a predetermined second selection signal; and a current source transistor connected to the upstream node, the first and second capacitive elements respectively have first ends connected in common to the upstream node and second ends connected to the first selection circuit, and the third and fourth capacitive elements respectively have first ends connected in common to the upstream node and second ends connected to the second selection circuit.

9. The solid-state imaging element according to claim 8, wherein the first and second upstream selection transistors sequentially transition to a closed state immediately before a predetermined exposure end timing and after the exposure end timing, the first reset transistor initializes the first floating diffusion layer when the first upstream selection transistor is in the closed state, the second reset transistor initializes the second floating diffusion layer when the second upstream selection transistor is in the closed state, the first and second upstream selection transistors sequentially transition to the closed state immediately after the exposure end timing, and the first and second upstream transfer transistors transfer the charges at a predetermined exposure end timing.

10. The solid-state imaging element according to claim 1, further comprising a short-circuit transistor that opens and closes a path between a first downstream node and a second downstream node, wherein the predetermined number of capacitors include first, second, third, fourth, fifth, sixth, seventh, and eighth capacitive elements, and the selection section includes:

a first selection circuit that connects any of the first and second capacitive elements to the first downstream node;

a second selection circuit that connects any of the third and fourth capacitive elements to the first downstream node;

a third selection circuit that connects any of the fifth and sixth capacitive elements to the second downstream node; and a fourth selection circuit that connects any of the seventh and eighth capacitive elements to the second downstream node.

11. The solid-state imaging element according to claim 10, wherein the short-circuit transistor is in an open state in a predetermined non-addition mode, and in the non-addition mode, the selection section performs control to sequentially connect each of the first and second capacitive elements to the first downstream node, control to sequentially connect each of the third and fourth capacitive elements to the first downstream node, control to sequentially connect each of the fifth and sixth capacitive elements to the second downstream node, and control to sequentially connect each of the seventh and eighth capacitive elements to the second downstream node in a predetermined order.

12. The solid-state imaging element according to claim 10, wherein the short-circuit transistor is in a closed state in a predetermined addition mode, and in the addition mode, the selection section sequentially performs control to connect one of the fifth and sixth capacitive elements and one of the seventh and eighth capacitive elements to the second downstream node while connecting one of the first and second capacitive elements and one of the third and fourth capacitive elements to the first downstream node, and control to connect another of the fifth and sixth capacitive elements and another of the seventh and eighth capacitive elements to the second downstream node while connecting another of the first and second capacitive elements and another of the third and fourth capacitive elements to the first downstream node.

13. The solid-state imaging element according to claim 1, wherein the predetermined number of capacitive elements include first and second capacitive elements and a third capacitor, the upstream circuit block includes:

a first photoelectric conversion element;

a first upstream transfer transistor that transfers a charge from the first photoelectric conversion element to a predetermined floating diffusion layer;

a second photoelectric conversion element;

a second upstream transfer transistor that transfers a charge from the second photoelectric conversion element to a predetermined floating diffusion layer;

a reset transistor that initializes the floating diffusion layers; and an upstream amplification transistor that amplifies voltages of the floating diffusion layers and outputs the amplified voltages to a predetermined upstream node, and the first and second capacitive elements and the third capacitive element respectively have first ends connected in common to the upstream node and second ends connected to the selection section.

14. The solid-state imaging element according to claim 13, wherein the first and second upstream transfer transistors transfer the charges to the floating diffusion layers at a predetermined exposure start timing, and the reset transistor initializes the first and second photoelectric conversion elements together with the floating diffusion layers, and the first and second upstream transfer transistors sequentially transfer the charges to the first and second floating diffusion layers at a predetermined exposure end timing.

15. The solid-state imaging element according to claim 13, wherein the selection section sequentially performs control to connect one of the first and second capacitive elements to the downstream node, control to connect another of the first and second capacitive elements to the downstream node, and control to connect the third capacitive element to the downstream node.

16. The solid-state imaging element according to claim 1, wherein the upstream circuit block is provided on a first chip, and the predetermined number of capacitive elements, the selection section, the downstream reset transistor, and the downstream circuit are provided on a second chip.

17. The solid-state imaging element according to claim 16, further comprising an analog-to-digital converter that sequentially converts the output reset level and the plurality of output signal levels into digital signals, wherein the analog-to-digital converter is provided on the second chip.

18. The solid-state imaging element according to claim 16, further comprising an analog-to-digital converter that sequentially converts the output reset level and the plurality of output signal levels into digital signals, wherein the analog-to-digital converter is provided on a third chip.

19. An imaging device comprising:

a predetermined number of capacitive elements;

an upstream circuit block that generates each of a predetermined reset level and a plurality of signal levels each corresponding to an exposure amount and causes the capacitive elements, different from each other, to hold the reset level and the plurality of signal levels;

a selection section that sequentially performs control to connect the capacitive element in which the reset level is held among the predetermined number of capacitive elements to a predetermined downstream node, control to disconnect the predetermined number of capacitive elements from the downstream node, and control to connect the capacitive element in which any of the plurality of signal levels is held among the predetermined number of capacitive elements to the downstream node;

a downstream reset transistor that initializes a level of the downstream node when the predetermined number of capacitive elements are disconnected from the downstream node;

a downstream circuit that sequentially reads each of the reset level and the plurality of signal levels via the downstream node; and a signal processing circuit that sequentially converts the reset level and the plurality of signal levels into digital signals and processes the digital signals.

20. A solid-state imaging element comprising:

a first photoelectric conversion element that converts incident light into a charge;

a second photoelectric conversion element that converts incident light into a charge;

an upstream amplification transistor that converts the charges into voltages;

a predetermined number of capacitive elements each having first end connected to as upstream node which is an output destination of the upstream amplification transistor;

a predetermined number of selection transistors inserted in each of paths between each of second ends of the predetermined number of capacitive elements and a predetermined downstream node;

a reset transistor having a source or a drain connected to the downstream node; and a downstream amplification transistor that has a gate connected to the downstream node and outputs a pixel signal.

* * * * *